United States Patent [19]
Pradhan et al.

[11] 3,883,724
[45] May 13, 1975

[54] HYBRID ANALYZER FOR FAST LOAD FLOW AND TRANSIENT SOLUTION OF POWER SYSTEMS

[75] Inventors: Ashok H. Pradhan; Fred S. Marton, both of Monroeville, Pa.

[73] Assignee: Westinghouse Electric Corporation, Pittsburgh, Pa.

[22] Filed: Sept. 11, 1973

[21] Appl. No.: 396,259

[52] U.S. Cl. .............. 235/151.21; 235/184; 444/1; 307/31; 307/52
[51] Int. Cl. ...... G06j 3/00; G06g 7/62; G06f 15/56
[58] Field of Search............ 235/151.21, 151.3, 151, 235/184; 307/18, 19, 20, 31–38, 52, 62; 444/1; 340/172.5

[56] References Cited
OTHER PUBLICATIONS

Computer Control of Electrical Distribution, Control, Nov. 1964, pp. 589-591.
Computer Control of Power Systems, The Engineer, Oct. 2, 1964.
Considerations in the Regulation of Interconnected Areas, IEEE Transactions on Power and Systems, Dec. 1967, pp. 1527-1539.

Primary Examiner—Malcolm A. Morrison
Assistant Examiner—Edward J. Wise
Attorney, Agent, or Firm—E. F. Possessky

[57] ABSTRACT

This invention relates to hybrid computer arrangement for representing an electric power system and for generating load flow solutions therefor. The employment of modular circuits for simulating actual system buses and transmission lines as utilized and circuit stability is ensured by the application of Nyquist stability criteria. Bus modules include the added feature of proportional plus integral control to allow for low proportional gain and high damped response.

The application of Nyquist stability criteria also allows for minimum element representation of transmission line and bus parameters which may include transmission line series branch impedance and bus to ground admittance. Potentiometers are employed for representation of transmission line series branch resistance and reactance, and digital to analog multipliers are employed for representation of bus to ground conductance and susceptance under digital control.

An iterative process utilizing unique preselected algorithms for initial conditions and iterative increments is employed.

37 Claims, 14 Drawing Figures

HYBRID ANALYZER FOR FAST LOAD FLOW AND TRANSIENT SOLUTION OF POWER SYSTEMS

BACKGROUND OF THE INVENTION

The present invention relates to electric power systems and more particularly to analog computer systems and hybrid computer systems which are operated to provide both load flow solutions and transient stability analysis capability.

Power system studies generally have been performed on special purpose analog computers known as AC network calculators or network analyzers particularly throughout the time period from 1929 to about 1955. The analyzers modeled actual power systems directly with the employment of lumped resistance and inductance for transmission lines and small transformers with rotatable cores for synchronous generators. With the additional employment of symmetrical component transformation, special purpose circuits for induction motors, step-by-step slide rule calculations and other means, load flow studies, transient stability studies, and other power system studies were successfully carried out. DC network analyzers have been employed, but they were limited to real power load flow studies.

One significant limitation in the utility of network analyzers was that the size of the power system which could be represented was limited by the amount of equipment in any particular network analyzer installation. Historically, only a few developed network analyzers were large enough to handle large power systems, and even the largest network analyzers were limited to about 40 generation units and 400 transmission lines. Electric power companies without their own network analyzers had to schedule the use of an available network analyzer one to two years in advance and then set up and study all of the study cases needed for the following year in a calculation use period of one or two weeks. Any errors made in the study cases could only be corrected during the next scheduled usage of the network analyzer. Data handling, analyzer set up, reading and recording functions were generally performed manually.

By about 1955 general purpose digital computers had become available to electrical apparatus manufactuers and at least some of the larger electric power companies. Accordingly, methods and algorithms were soom developed for software solution and/or analysis of power system study cases. By 1960, many digital computer programs had been developed to solve or analyze various power system study cases and such cases could be run more accurately and at lower cost with the digital computers as compared to the analog network analyzers. Many additional digital computer program developments have occurred since 1960.

With recent awareness of the possibilities of power system "blackouts" and "brownouts," increasing emphasis has developed for the improvement of power system reliability and security with particular regard to overloads at steady state. Power system security is provided in the first instance by provision of adequate generation and transmission capacity for expected system loads. Additional security measures include a tying of power companies into power pools to strengthen the transmission network, the adoption of emergency load shedding procedures, and automatic control of power systems by on-line digital control computers. Security considerations have further increasingly made it desirable to provide for on-line power system studies so that consequences of system changes or trends can be rapidly evaluated to provide system security. Although the programmed digital computer generally performs satisfactorily in making off-line power system studies, on-line implementation of software power system studies often are either infeasible or if feasible subject to various disadvantages such as limited solution speed.

Generally, digital load flow and transient stability programs have been refined through the years to provide faster solution speeds due to the use of more efficient algorithms, such as the Newton Raphson method, coupled with the high speed of available digital computers. Such digital programs have been commonly used for system planning functions and are usually highly flexible for adaption to a variety of network configurations. Further, the digital programs allow sophisticated representation of various special functions including phase shifting transformers, remote voltage controlled buses and tie lie controls. In any case, the speed of digital load flow and transient stability programs has been a deterrent to on-line implementation. In contrast, the possibilities for use of hybrid computer arrangements or all analog arrangements for on-line applications are made evident by the fact that the on-line applications usually require a relatively faster solution and can tolerate less accuracy, less network reconfiguring capability and less representational capability for special functions. Further, with respect to off-line studies, a hybrid arrangement or an all analog arrangement gives rise to immediately observable results in real time or faster than real time.

Previously filed related applications including W.E. 41,2361, Ser. No. 175,286, filed Aug. 26, 1971; W.E. 41,237, Ser. No. 175,292, filed Aug. 26, 1971; W.E. 41,499, Ser. No. 175,293, filed Aug. 26, 1971, now U.S. Pat. No. 3,808,409; W.E. 43,159, Ser. No. 175,289, filed Aug. 26, 1971; W.E. 43,161, Ser. No. 175,290, filed Aug. 26, 1971, now U.S. Pat. No. 3,839,629; and W.E. 43,162, Ser. No. 175,291, filed Aug. 26, 1971 generally provide for hybrid arrangements employing an analog simulator including modules representative of system buses and lines for generation of load flow solutions. Also provided for were convergence and monitoring of load flow solutions attained by these arrangements. Accordingly, these hybrid arrangements provide speed and computational improvements over the prior art just considered.

Further speed and computational improvements are achieved by representing most or all of the actual power system components through analog simulation. Additionally, all analog simulation can be supplemented by hardware or software for the performance of transient stability analysis computations in real time or faster than real time. These features are set forth in previously filed applications including W.E. 42,993, Ser. No. 254,957, filed May 19, 1972, now U.S. Pat. No. 3,826,906; W.E. 43,296, Ser. No. 255,246, filed May 19, 1972, now Pat. No. 3,825,732; W.E. 43,455, Ser. No. 255,167, filed May 19, 1972, now U.S. Pat. No. 3,832,534; W.E. 43,824, Ser. No. 255,111, filed May 19, 1972, now U.S. Pat. No. 3,829,699; W.E. 43,825, Ser. No. 255,049, filed May 19, 1972; W.E. 43,826, Ser. No. 255,048, filed May 19, 1972; W.E. 43,827, Ser. No. 255,110, filed May 19, 1972, now U.S. Pat. No. 3,829,667; W.E. 43,828, Ser. No. 255,050, filed May 19, 1972, now U.S. Pat. No.

3,824,624; W.E. 43,829, Ser. No. 254,859, filed May 19, 1972, now Pat. No. 3,833,927; and W.E. 42,990, Ser. No. 254,858, filed May 19, 1972, now U.S. Pat. No. 3,832,533.

The disclosures in this application provide further improvements and variously pertain to minimum element hardware and software structure of hybrid and all analog computer arrangements relating to both load flow studies and transient stability analysis capability. No representation is made that any prior art considered herein is the best pertaining prior art nor that the considered prior art cannot be interpreted differently from the interpretations placed on it herein.

BRIEF DESCRIPTION OF THE DRAWINGS

In accordance with the description of the preferred embodiments herein, the following drawings and Figures are set forth.

THE LOAD FLOW COMPUTER ARRANGEMENT

The load flow problem in an electric power system is to solve Kirchoff's node equations at the buses or nodal points in the system and to find the steady state bus voltages and power flows under specified bus conditions. Buses in the system are classified according to variables specified. For example, a swing bus (slack or infinite bus) is one which has its voltage magnitude and angle specified; a load bus is one which has its delivered active and reactive powers specified; a voltage regulated bus has its voltage magnitude and delivered active power specified; a constant current bus is one which has its current magnitude and angle specified; and a constant admittance bus is one which has its bus to ground complex admittance (self-admittance) specified.

For load flow studies, the usual practice is to recognize only swing, load and voltage regulated bus since these are the most common types of buses encountered. Generator buses in the power system are simulated as voltage regulated buses during the load flow solution, with the exception that at least one generator bus is simulated as a swing bus to provide a point of reference for other bus voltage magnitudes and angles. For transient stability analysis, all buses except generator buses are treated as constant admittance buses. Generator buses are preferably modeled herein as constant voltage behind transient reactance buses, as will be described hereinafter.

Figure 1:
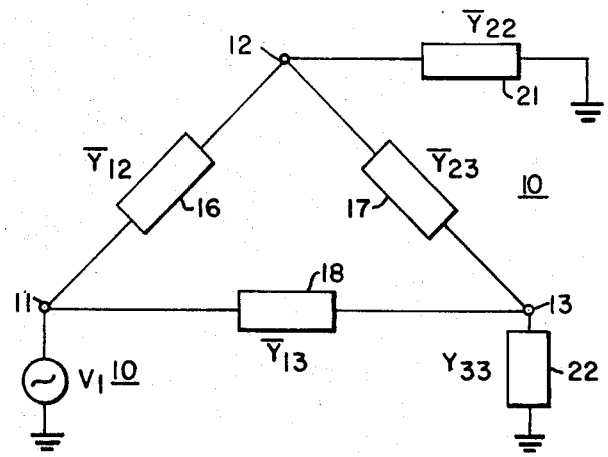
FIG. 1 shows in schematic form a three-bus test electric power system network for the load flow problem.

As an example of a simple test electric power system simulation for load flow study, reference is now made to the schematic of FIG. 1. Therein is depicted a three bus system 10 including a swing bus 11 having a voltage of magnitude V1 and angle 0°, a load bus 12 and a voltage regulated bus 13. Blocks 16, 17 and 18 represent transmission line impedances $Y_{12}$, $Y_{23}$ and $Y_{13}$, respectively between buses 11, 12 and 13, while blocks 21 and 22 represent the bus to ground admittances $Y_{22}$ and $Y_{33}$ of buses 12 and 13, respectively.

For a system of n buses, if $\overline{I}$ represents an $n \times 1$ complex vector of bus to ground currents, $\overline{\overline{Y}}_L$ represents an nxn complex symmetric matrix of line admittances and $\overline{E}$ represents an nx1 vector of bus voltages measured with respect to ground, then:

$$\overline{I}_L = \overline{\overline{Y}}_L \overline{E}$$

(1)

Further, if $\overline{\overline{Y}}_{BB}$ represents an nxn complex diagonal matrix of bus self-admittances, then:

$$\overline{I} = \overline{\overline{Y}}_{BB} \overline{E}$$

(2)

and the load flow problem constitutes the solution and enforcement of the equation:

$$\overline{\overline{Y}}_{BB} \overline{E} = \overline{\overline{Y}}_L \overline{E}$$

(3)

Figure 2:
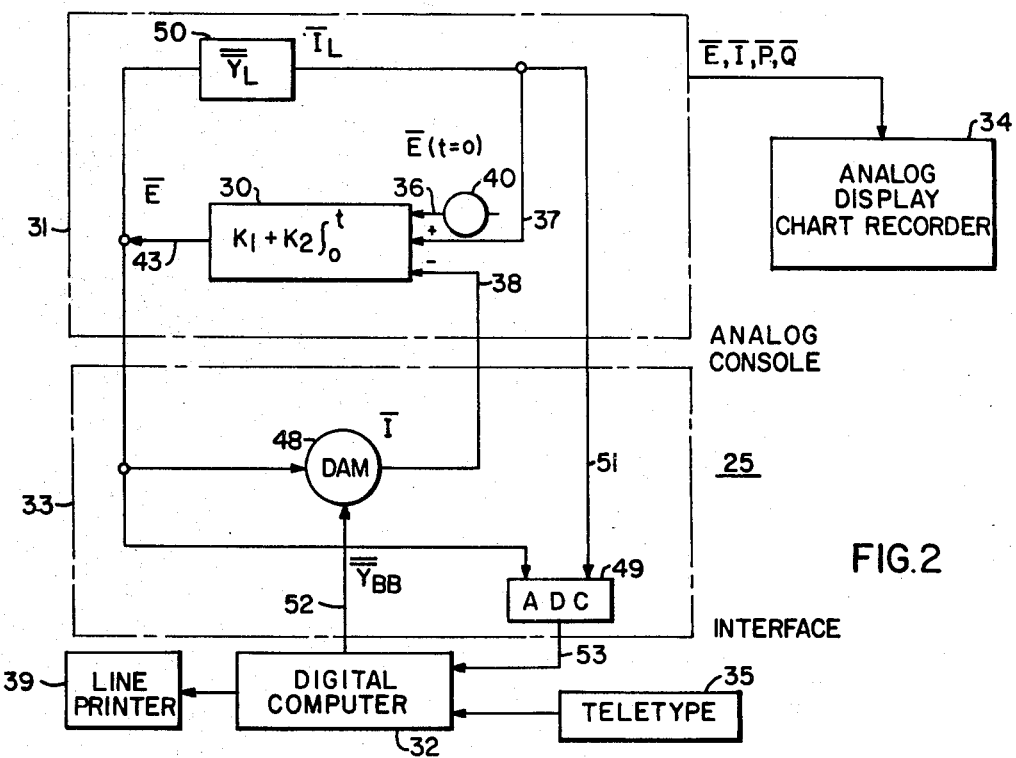
FIG. 2 depicts in block diagram form a representation of a hybrid analyzer for the load flow solution of an electric power system.

Reference is now made to FIG. 2 which shows a hybrid computer model 25 in block diagram form for solving equation (3) above. The hybrid arrangement 25 includes an analog portion 31, a digital computer 32 and an interface portion 33. Also included in arrangement 25 are analog display devices 34, as well as a teletype data input 35 to digital computer 32 and a line printer 39 connected to an output from digital computer 32.

The analog portion 31 of hybrid arrangement 25 includes a line impedance block 50 and a proportional plus integral controller block 30. The line impedance block includes transmission line modules for representing the series branch equivalent impedances $\overline{\overline{Y}}_L$ of transmission lines in the actual electric power system to be described more fully hereinafter. Input to line impedance block 50 over connection 43 is the bus voltage vector $\overline{E}$ which is derived as an output from proportional plus integral controller 30. The proportional plus integral controller 30 includes various bus modules for simulation of various types of buses in the electric power system also to be described more fully hereinafter. One feature of the controller 30 is that it provides a proportional gain $K_1$ and an integral gain $K_2$ which are adjusted to give a fast stable response to inputs to the controller 30. Inputs to the controller 30 are an initial condition input 36 for delivering values of bus voltages at time $t=0$ ($\bar{E}_{t=0}$), the output $\bar{I}_L$ from line impedance block 50 over connection 37 and the bus to ground current vector $\bar{I}$ over connection 38.

Within the interface portion 33 of hybrid arrangement 25 are a digital-analog multiplier 48 and an analog to digital conversion device 49, both of which may be of conventional type. Input to the digital-analog multiplier 48 are the bus voltage vector $\bar{E}$ from connection 43 and the matrix of bus self-admittances $\bar{\bar{Y}}_{BB}$ over connection 52 from the digital computer 32. The $\bar{\bar{Y}}_{BB}$ self-admittances are coefficients set by the digital computer 32 from data input to the computer 32 from teletype device 35, which data includes bus to ground susceptances and conductances chosen to have initial values in a manner to be described hereinafter. The output produced from the digital-analog multiplier 48 is the bus to ground current vector $\bar{I}$, which is as previously stated input to the proportional plus integral controller 30.

The steady state bus voltage $\bar{E}$ and the steady state line currents $\bar{I}_L$ are sent to the digital computer 32 over connections 43 and 51 respectively, through the analog-digital conversion device 49 for the calculation of new coefficients, $\bar{\bar{Y}}_{BB}$ through an iterative process to be described hereinafter. The $\bar{\bar{Y}}_{BB}$ coefficients are iterated until specified load flow conditions are met within desired tolerances; that is, the hybrid arrangement 25 operates to attain and enforce the equation $\bar{\bar{Y}}_{BB} \bar{E} = \bar{\bar{Y}}_L \bar{E}$ through iteration of the $\bar{\bar{Y}}_{BB}$ coefficients (self-admittance coefficients) if the load flow solution converges.

Accordingly, algorithms must be derived for iterating the bus to ground admittances, or self-admittances, to ensure convergence of the load flow solution. The following analysis yields the proper susceptances and conductances for self-admittance coefficients of the various types of buses in the electrical power system.

To begin with, certain power system parameters are defined at the end of a load flow iteration at the $k^{th}$ bus. They are as follows:

$\bar{E}_k$ — voltage at the $k^{th}$ bus with respect to ground;
$\bar{E}^*_k$ — conjugate of $\bar{E}_k$;
$E_k$ — magnitude of $\bar{E}_k$;
$\bar{I}_k$ — bus to ground current at the $k^{th}$ bus;
$P_k$ — active power delivered to the $k^{th}$ bus by the transmission lines which connect the $k^{th}$ bus;
$Q_k$ — lagging reactive power delivered to the $k^{th}$ bus by the transmission lines which connect to the $k^{th}$ bus;
$\bar{Y}_{kk}$ — self-admittance (bus to ground admittance) at the $k^{th}$ bus $= G_{kk} - jB_{kk}$ \hfill (4)

Dropping the "$k$" subscripts for reasons of simplicity, the following relationships exist:

$$P = Re\ \bar{E}^* \bar{I} = Re\ \bar{E}^* \bar{Y} \bar{E},$$

where:

"$Re$" denotes "the real part of";

or $$P = Re\ E^2(G - jB) = E^2 G,$$

where:

$G$ is the bus to ground conductance and
$B$ is the bus to ground susceptance;
and $$Q = Im\ \bar{E}^* \bar{I} = E^2 B,$$

where:
"$Im$" denotes "the imaginary part of";
Dividing by $E^2$ and summarizing:

$$G = P/E^2 \qquad (5)$$

and $$B = Q/E^2 \qquad (6)$$

Further parameters to be defined include the following:

$P_s$ — specified value of real power, $P$, delivered to the $k^{th}$ bus;
$Q_s$ — specified value of reactive power, $Q$ delivered to the $k^{th}$ bus;
$E_s$ — specified value of $k^{th}$ bus voltage magnitude.

Hence, for the previously noted voltage regulated type of bus, the real power and voltage magnitude are specified ($P_s$ and $E_s$); and for the previously noted load type of bus, the real and reactive powers are specified ($P_s$ and $Q_s$). Accordingly, for a voltage regulated bus, from equation (5).

$$G = P_s/E_s^2 \qquad (7)$$

but $B$ cannot be directly ascertained from equation (6) because the reactive power, $Q$, at a voltage regulated bus, is not specified. For a load bus neither $G$ nor $B$ can be evaluated since the bus voltage, $E$, is not specified. To obtain the load flow solution via an iterative process with respect to variables $G$ and $B$, the relation between changes in the variables is defined by taking total differentials of both sides of equations (5) and (6). Thus, we have:

$$dG = dP/E^2 + P.d\ (1/E^2),$$

and $$dB = dQ/E^2 + Q.d\ (1/E^2)$$

or for small changes ($\Delta$) in the variables, $$\Delta G = \Delta P/E^2 + P.\Delta(1/E^2) \qquad (8)$$

and $$\Delta B = \Delta Q/E^2 + Q.\Delta(1/E^2) \qquad (9)$$

As stated above, $\Delta G$ and $\Delta B$ at load buses and $\Delta B$ at voltage regulated buses must be known in order to reach a load flow solution by iterating bus to ground $G$'s and $B$'s. Hence, $\Delta P$, $\Delta Q$ and $\Delta(1/E^2)$ must be estimated at a particular load bus, and $\Delta Q$ and $\Delta(1/E^2)$ must be estimated at a particular voltage regulated bus.

That is, these changes in $P$, $Q$ and $1/E$ must be estimated on the basis of what will have occurred at the end of the next iteration. Accordingly, for a load bus, $$\Delta P = P_s - P \tag{10}$$

and $$\Delta Q = Q_s - Q \tag{11}$$

where:

$P$ and $Q$ are present values. For a load bus $$\Delta(1/E^2) = 1/E_s^2 - 1/E^2 \tag{12}$$

and $$\Delta P = P_s - P$$

where:

$E$ and $P$ are present values.

Since $E$, for a load bus, and $Q$, for a voltage regulated bus are unspecified, they, in turn, must be estimated. The following choices are made, letting $E_{es}$ = value of $E$ estimated to exist at a load bus at the end of the next load flow iteration, and $Q_{es}$ = value of $Q$ estimated to exist at a voltage regulated bus at the end of the next load flow iteration.

The values of $E_{es}$ and $Q_{es}$ are estimated by exponential extrapolation as follows:

$$E_{es} = E_j + 0.63 \cdot \frac{E_j - E_{j-1}}{P_j - P_{j-1}}(P_s - P_j) \tag{13}$$

and $$Q_{es} = Q_j + 0.63 \cdot \frac{Q_j - Q_{j-1}}{E_j - E_{j-1}}(E_s - E_j) \tag{14}$$

where a variable with subscript "$s$" is the specified value of that variable, and a variable with subscript "$j$" is the value of that variable at the end of the $j^{th}$ iteration.

Accordingly, for a load bus $$\Delta(1/E^2) = 1/E_{es}^2 - 1/E^2 \tag{15}$$

and for a voltage regulated bus $$\Delta Q = Q_{es} - Q \tag{16}$$

For any iterative algorithm, the choice of initial conditions is important. The closer the initial conditions lie to the final or desired conditions, the more is the likelihood of reaching the final conditions in fewer iterations. It is well known that for any well designed power system, the steady state bus voltages are not too different in magnitude and phase, and so, a good choice of initial voltage conditions would be to assume the voltages of all system buses to be equal in magnitude and phase of the swing bus voltage, $\bar{V}_s$ ($V_1 \angle 0$ in FIG. 1). Hence, $$E_o = V_s, \; P_o = 0 \text{ and } Q_o = 0 \tag{17}$$

for all buses, where $E_o$, $P_o$ and $Q_o$ are initial values of bus voltage magnitude, real and reactive powers respectively.

The initial values of susceptance $G$ and conductance $B$ ($G_o$, $B_o$) are chosen as those required to obtain the specified $P$ and $Q$ at the initial voltage magnitudes, $V_s$. Thus, for load buses, from equations (5) and (6), $$G_o = P_s/V_s^2 \text{ and } B_o = Q_s/V_s^2 \tag{18}$$

Figure 3:
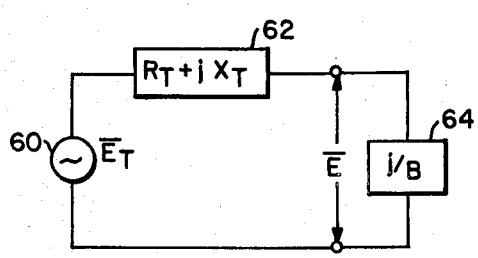
FIG. 3 shows a Thevenin's equivalent network for the reactive load on an electric power system voltage regulated bus.

For voltage regulated buses, from equation (7), $$G_o = P_s/E_s^2$$

but since $Q$ is not specified for these buses, $B_o$ must be somewhat arbitrarily chosen. So as not to make a completely arbitrary choice, an algorithm for such a choice as devised below via the use of Thevenin's equivalent. Reference is made, thereof, to FIG. 3 wherein it is depicted in schematic form a Thevenin equivalent circuit as seen from the terminals of the reactive load on a voltage regulated bus. It will be appreciated that such an equivalent circuit represents the balance of the power system network, as seen from the reactive load terminals, by a voltage source in series with an impedance. Shown in FIG. 3 is a voltage source 60, generating a Thevenin equivalent voltage $\bar{E}_T$, in series with a Thevenin impedance 62, having a value $R_T + jX_T$, where $R_T$ is the resistive portion of the Thevenin impedance and $X_T$ is the reactive portion of the Thevenin impedance. This serial combination is connected to the terminals of the reactive load on a voltage regulated bus, indicated by reference numeral 64, and having an impedance $j/B$. The voltage drop across the reactive load is indicated as $\bar{E}$.

Recalling that the initial condition conductance, $B_o$, must arbitrarily be chosen for a voltage regulated bus, the following observations and calculations are made from the circuit of FIG. 3 to achieve a choice of $B_o$.

First, it is noted that $$\bar{E} = \frac{j/B}{R_T + j(X_T + 1/B)} \cdot \bar{E}_T.$$

Therefore, $$E = \sqrt{\frac{1/B}{R_T^2 + (X_T + 1/B)^2}} \cdot E_T = \sqrt{\frac{E_T}{B^2 R_T^2 + (BX_T + 1)^2}} = \frac{E_T}{\alpha^{1/2}}$$

where $$\alpha = B^2 R_T^2 + (BX_T + 1)^2.$$

Taking total differentials, $$dE = \frac{-E_T}{2\alpha^{3/2}} \cdot \frac{d\alpha}{dB} dB$$

$$= \frac{-E_T}{2\alpha^{3/2}} [2 R_T^2 B + 2 X_T(BX_T + 1)] dB.$$

From the above, when $B=0$, $\alpha=1$ and $E_T=E$ and $$\left.\frac{dB}{dE}\right|_{B=0} = \left.\frac{-dE}{EX_T}\right|_{B=0} = \left.\frac{-dE}{\beta E^2}\right|_{B=0} \quad (19)$$

where $$\beta = \frac{X_T}{E}.$$

For practical power systems, $\beta \leq 1$. However, choosing a small value of $\beta$ presents the possibility of taking too large an initial step in $\beta$ which may overload the analog portion of the hybrid arrangement of FIG. 2. To avoid such a possibility, a conservative value of $\beta = 1$ is chosen.

Substituting $\beta = 1$ and replacing $dE$ by the desired change $(E_s - E)$, equation (19) becomes $$\left.\Delta B\right|_{B=0} = \left.\frac{E_s - E}{E^2}\right|_{B=0} \quad (20)$$

The initial conditions and algorithms for computing $\Delta B$ and $\Delta G$ in the aforementioned iterative process are summarized below:

INITIAL CONDITIONS:

For load buses:

$$G_o = P_s/V_s^2, \quad B_o = Q_s/V_s^2 \quad (18)$$

For voltage regulated buses:

$$G_o = P_s/E^2 \quad B_o = 0 \quad (7)$$

ALGORITHMS:

For load buses:

$$\Delta G = \Delta P/E^2 + P \cdot \Delta(1/E^2) \quad (8)$$

$$\Delta P = P_s - P \quad (10)$$

$$E_{es} = E_j + 0.63 \cdot \frac{E_j - E_{j-1}}{P_j - P_{j-1}}(P_s - P_j) \quad (13)$$

$$\Delta(1/E^2) = 1/E_{es}^2 - 1/E^2 \quad (15)$$

$$E_o = V_s, \quad P_o = 0, \quad Q_o = 0 \quad (17)$$

$$\Delta B = \Delta Q/E^2 + Q \cdot \Delta(1/E^2) \quad (9)$$

$$\Delta Q = Q_s - Q \quad (11)$$

$$(1/E^2) = 1/E_{es}^2 - 1/E^2 \quad (15)$$

For voltage regulated buses:
$\Delta G = 0$, $$\left.\Delta B \text{ for 1}^{st} \text{ iteration} = \Delta B\right|_{B=0} = \left.\frac{-E_s - E}{E^2}\right|_{B=0} \quad (20)$$

$\Delta B$ for subsequent iterations =

$$\frac{\Delta Q}{E^2} + Q \cdot \Delta(1/E^2) \quad (9)$$

$$\Delta(1/E^2) = 1/E_s^2 - 1/E^2 \quad (12)$$

$$Q_{es} = Q_j + 0.63 \cdot \frac{Q_j - Q_{j-1}}{E_j - E_{j-1}}(E_s - E_j) \quad (14)$$

$$\Delta Q = Q_{es} - Q \quad (16)$$

SIMULATION

Figure 4:
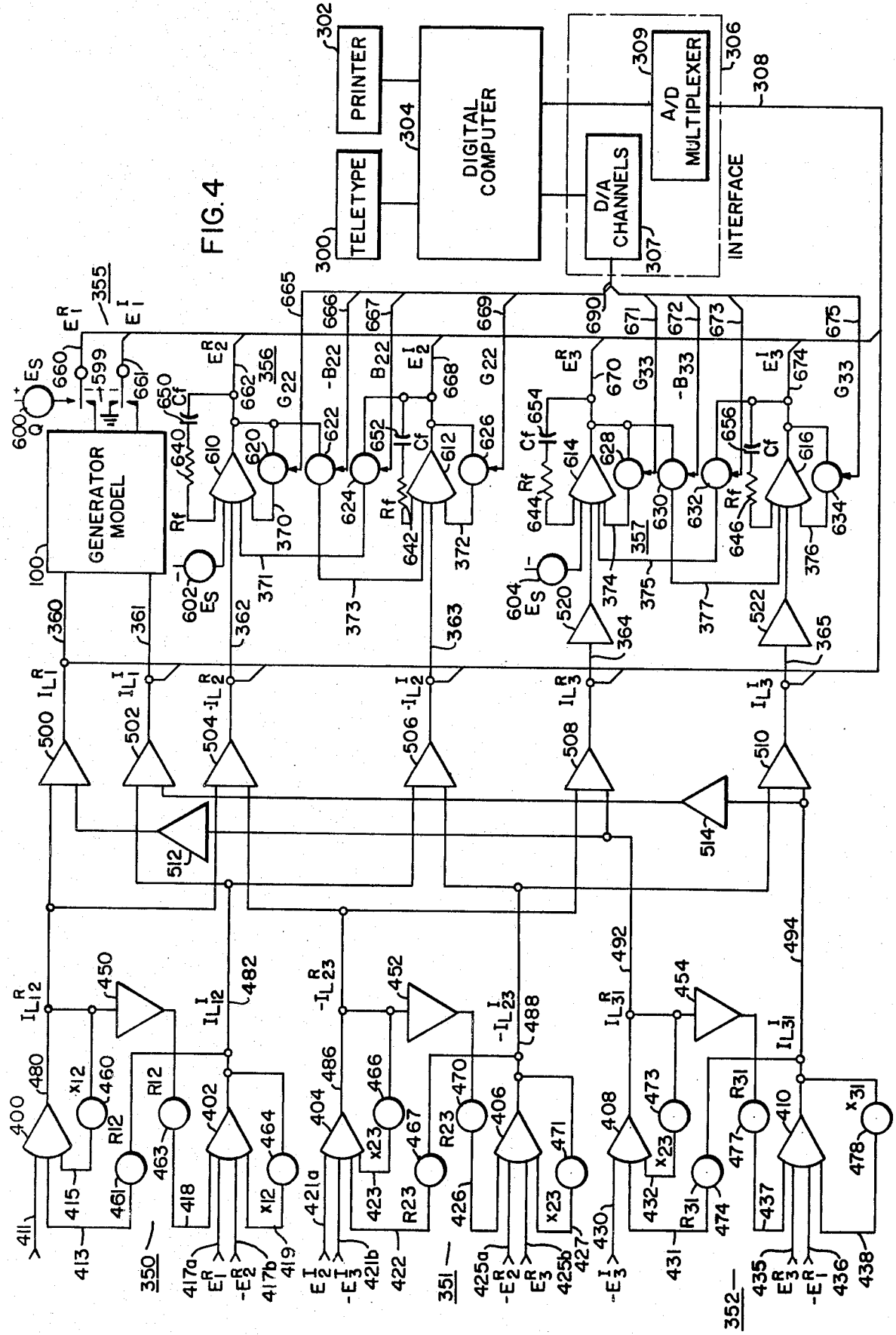
FIG. 4 illustrates in schematic and partial block diagram form the hybrid computer arrangement for load flow solution with more detail given to the analog portion of that arrangement.

Reference is now made to FIG. 4 which depicts in schematic form the hybrid arrangement of FIG. 1 with more particularity as to the analog portion of the arrangement. As shown in FIG. 4, the analog portion is divided into three categories: transmission line circuitry, bus nodal circuitry and bus module circuitry. Also shown in FIG. 4 is a generator model 100 to be employed for transient stability study purposes and to be described more fully hereinafter.

Before describing the operation of the circuitry shown in FIG. 4, it would be beneficial to describe individually the modules for system transmission lines and buses. Such a description ensues.

TRANSMISSION LINES

Figure 5:
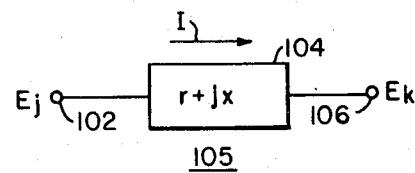
FIG. 5 sets forth a block diagrammatic representation of an electric power system transmission line.

Reference is now made to FIG. 5 which depicts a frequently used series branch impedance representative of an electric power system transmission line. Shown in FIG. 5 is a block 104 representative of the series branch impedance of a system transmission line connected between two buses, say bus $j$ and bus $k$, having complex bus voltage $E_j$ and $E_k$ at terminals 102 and 106 respectively. A current I flowing through the impedance 104 is the complex line current from bus $j$ to bus $k$.

From Ohm's law, the following equations are developed:

$$U = rI^r - xI^i$$
$$V = xI^r + rI^i \quad (21)$$

where $$U = E_j{}^r - E_k{}^r$$
$$V = E_j{}^i - E_k{}^i \quad (22)$$

and superscripts $r$, $i$ denote real and imaginary parts.

Figure 6:
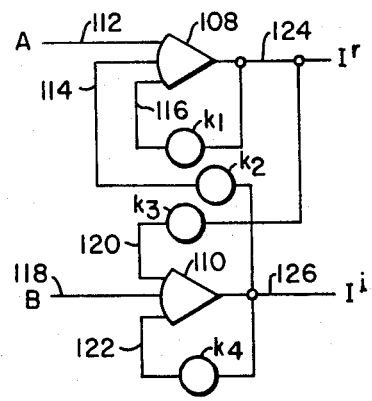
FIG. 6 sets forth a general analog transmission line modular representation.

Reference is now made to FIG. 6 which shows in schematic form a transmission line module using high gain operational amplifiers for implementation of equations (21) and (22). The circuit disclosed in FIG. 6 is a minimum element module for simulating any phenomena described by equivalent equations with particular employment here being made for electric power system transmission lines. Shown in FIG. 6 are amplifiers 108 and 110 preferably being high gain operational amplifiers. Amplifier 108 has three inputs 112, 114 and 116, and an output 124. The output 124 carries a signal representative of the real part of the complex line current, $I^r$.

The amplifier 110 similarly has three inputs 118, 120 and 122, and an output 126. The output 126 carries a signal representative of the imaginary part of the complex line current, $I^i$.

Input 112 to amplifier 108 carries a signal designated A, to be described hereinafter; input 114 carries a signal $k_2 I^i$; and input 116 carries a feedback signal $k_1 I^r$. Input 118 to amplifier 110 carries a signal designated B, also to be described more fully hereinafter; input 120 carries a signal $k_3 I^r$; and input 122 carries a feedback signal $k_4 I^i$.

Regarding input signals $A$ and $B$, because the inputs to a high gain operational amplifier must sum to zero, the following equations are satisfied by the circuit of FIG. 6:

$$A = -k_1 I^r - k_2 I^i$$
$$B = -k_3 I^r - k_4 I^i$$
(23)

The stability of the transmission line module circuit of FIG. 6 can be insured in two ways:
i. By first stabilizing the loop including amplifier 108 and the potentiometer designated $k_1$, and then stabilizing the entire circuit; or
ii. By first stabilizing the loop including the amplifier 110 and the potentiometer designated $k_4$, and then stabilizing the entire circuit.

For (i), the primary stability requirement is that the gain $k_1$ be greater than zero ($k_1 > 0$), and for (ii), the primary stability requirement is that the gain $k_4$ be greater than zero ($k_4 > 0$). Other stability requirements will be described with reference to FIGS. 7A and 7B.

Figure 7A:
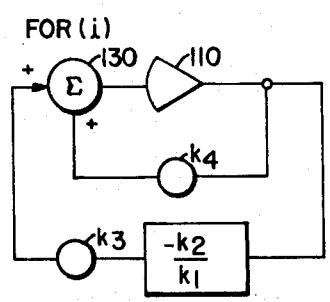
FIGS. 7A and 7B depict transfer function circuit representations of the circuit of FIG. 6, employed for circuit stability calculations.
Figure 7B:
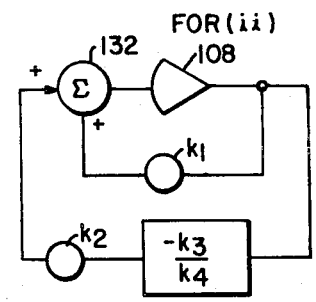

Reference is now made to FIGS. 7A and 7B which depict in schematic form transfer function circuit representations for cases (i) and (ii) above, respectively. As stated above, one stability requirement for (i) is that $k_1$ be greater than zero. Choosing $k_1$ greater than zero stabilizes the loop including amplifier 108 and gain $k_1$ and satisfies the first part of i) above. FIG. 7A depicts a representation for stabilizing the entire circuit with $k_1$ greater than zero. Shown in FIG. 7A is the amplifier 110 having an input from a summer 130. The summer 130 sums the output of amplifier 110 multiplied by gain $k_4$, as well as the output of amplifier 110 multiplied by a gain $k_3 [-k_2/k_1]$. The representation of FIG. 7A is derived from the circuit of FIG. 6 beginning at the output of amplifier 110 through gain $k_2$, thence through amplifier 108 with feedback gain $k_1$ (represented by $-1/k_1$, assuming amplifier 108 has unity gain, as well as inversion), thence through gain $k_3$ to amplifier 110, to yield $k_3 [-k_2/k_1]$, which the output of amplifier 110 is sent through to summer 130. And, of course, the output of amplifier 110 is also fed back through the gain $k_4$ to the summer 130.

A similar analysis with respect to ii) above is made in light of FIG. 7B. Referring to FIG. 7B, there is shown the amplifier 108 having an input from a summer 132. The summer 132 sums the output of the amplifier 132 multiplied by a gain $k_1$ as well as the output of the amplifier 132 multiplied by a gain $k_2 [-k_3/k_4]$. The representation of FIG. 7B is derived from the circuit of FIG. 6 beginning at the output of amplifier 108 through gain $k_3$, thence through amplifier 110 with feedback gain $k_4$ (represented by $-1/k_4$, assuming amplifier 110 has unity gain, as well as inversion) thence through gain $k_3$ to amplifier 108, to yield $k_2 [-k_3/k_4]$, which the output of amplifier 108 is sent through to summer 132. The output of amplifier 108 is also fed back through the gain $k_1$ to the summer 132.

Ultimate stability of the circuit of FIG. 6 is assured through the application of the Nyquist stability criterion to the representation of FIG. 7A or FIG. 7B. Under Nyquist's Criterion, stability is assured by the application of the following inequality $GH' > 0$, where $G$ is the forward loop transfer function and $H'$ is the negative of a positive feedback loop transfer function. In the case of FIG. 7A, the forward loop transfer function G equals $-1$ (unity gain and inversion of amplifier 108) and the feedback loop transfer function $H'$ equals $$- \left[ k_4 - \frac{k_3 k_2}{k_1} \right].$$

In the case of FIG. 7B, the forward loop transfer function G again equals $-1$ while the feedback loop transfer function $H'$ equals $$- \left[ k_1 - \frac{k_2 k_3}{k_4} \right].$$

Hence, for case (i) and FIG. 7A the Nyquist Criterion require that:

$$(-1) \left( k_4 - \frac{k_2 k_3}{k_1} \right) > 0$$

or $$k_4 - \frac{k_2 k_3}{k_1} > 0 \quad \text{at } k_1 > 0 \qquad (24)$$

and for case (ii) and FIG. 7B:

$$(-1) \left( k_1 - \frac{k_2 k_3}{k_4} \right) > 0$$

or $$k_1 - \frac{k_2 k_3}{k_4} > 0 \quad \text{at } k_4 > 0 \qquad (25)$$

The transmission line module of FIG. 6 represented by equations (23) can simulate equations (21) in eight different ways, as shown in Table I below:

TABLE I

| CASE | A | B | $k_1$ | $k_2$ | $k_3$ | $k_4$ | loop gain |
|---|---|---|---|---|---|---|---|
| 1 | U | V | $-r$ | $x$ | $-x$ | $-r$ | $-x^2/r^2$ |
| 2 | $-U$ | V | $r$ | $-x$ | $-x$ | $-r$ | $-x^2/r^2$ |
| 3 | $-U$ | $-V$ | $r$ | $-x$ | $x$ | $r$ | $-x^2/r^2$ |

TABLE I-Continued

| CASE | A  | B  | $k_1$ | $k_2$ | $k_3$ | $k_4$ | loop gain |
|------|----|----|-------|-------|-------|-------|-----------|
| 4    | U  | −V | −r    | x     | x     | r     | $-x^2/r^2$ |
| 5    | V  | U  | −x    | −r    | −r    | x     | $-r^2/x^2$ |
| 6    | −V | U  | x     | r     | −r    | x     | $-r^2/x^2$ |
| 7    | −V | −U | x     | r     | r     | −x    | $-r^2/x^2$ |
| 8    | V  | −U | −x    | −r    | r     | −x    | $-r^2/x^2$ |

Shown in Table II below is the application of the conditions (24) and (25) to the four possible combinations of $r$ and $x$ as follows:

TABLE II

|                | (Table I Cases) |   |    |   |   |    |   |    |
|----------------|---|---|----|---|---|----|---|----|
|                | 1 | 2 | 3  | 4 | 5 | 6  | 7 | 8  |
| $r>0, x>0$     |   |   | OK |   |   | OK |   |    |
| $r>0, x<0$     |   |   | OK |   |   |    |   | OK |
| $r<0, x>0$     | OK |  |    |   |   | OK |   |    |
| $r>0, x<0$     | OK |  |    |   |   |    |   | OK |

As seen from Table II above, only four of the eight Table I cases result in stable circuits, specifically Cases 1, 3, 6 and 8. Case 1 is stable when $r<0, x>0$, and when $r<0, x<0$; Case 3 is stable when $r>0, x>0$, and when $r>0, x<0$; Case 6 is stable when $r>0, x>0$, and when $r<0, x<0$; and Case 8 is stable when $r>0, x<0$ and when $r<0, x<0$.

Returning to FIG. 6, it will be appreciated that, in accordance with the above observations, the circuit of FIG. 6 satisfies stability requirements when:

1. $A=U$, $B=V$, $k_1=-r$, $k_2=x$, $k_3=-x$ and $k_4=-r$;
2. $A=-U$, $B=-V$, $k_1=r$, $k_2=-x$, $k_3=x$ and $k_4=r$;
3. $A=-V$, $B=U$, $k_1=x$, $k_2=r$, $k_3=-r$, and $k_4=x$; and
4. $A=V$, $B=-U$, $k_1=-x$, $k_2=-r$, $k_3=r$ and $k_4=-x$.

Hence, any of the stable transmission line circuits of cases 1, 3, 6 and 8 can be represented through the employment of three operational amplifiers and four coefficient potentiometers. It is noted that FIG. 6 shows only two operational amplifiers. To be complete it is necessary that one of the cross coupling potentiometers in each of the above four implementations of the circuit of FIG. 6 have a unity gain inverting amplifier associated with it since coefficient potentiometers are non-inverting. An example is shown in FIG. 8.

Figure 8:
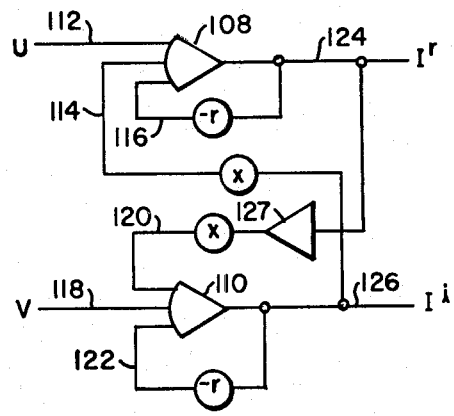
FIG. 8 sets forth in schematic form a stable transmission line module circuit.

Reference is now made, therefore, to FIG. 8 which depicts in schematic form case 1 of Table I with $r<0$ and $x>0$ as indicated in line 3 of Table II above. As shown, amplifier 108 has inputs U, $-rI^r$ and $xI^i$ respectively at input connections 112, 114 and 116 and generates an output $I^r$ at 124. It will be noted that the gain $-r$ has a positive value since $r<0$. Hence no inverter is necessary with respect to the feedback loop to input 116. Amplifier 110 has inputs V, $-xI^r$ and $-rI^i$ respectively at input connections 118, 120 and 122. Again, no inverter is necessary with respect to the feedback loop to input 122 because $r<0$. However, since $x>0$ an inverter 127 is associated with the gain $x$ to input 120 so that a $-x$ coefficient is produced.

Referring back to Table II above, it will be seen that for each pair of $r$ and $x$ there is a choice of two stabilize circuit implementations. From practical stability considerations involving imperfect amplifiers, it is recommended that to yield the lowest loop gain:

for $\left| \dfrac{x}{r} \right| <1$ implementation 1 or 3 be used;

for $\left| x/r \right| >1$, implementations 6 or 8 be used.

From these recommendations and the above consideration is a unique stable minimum element circuit for every combination of $r$ and $x$ exists.

BUS MODULES

Figure 9:
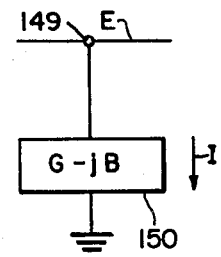
FIG. 9 illustrates in block diagram form a representation of the bus to ground admittance of an electric power system bus.

As previously noted, in the hybrid load flow circuit arrangement of FIG. 4, the load flow solution for the simulated electric power system is obtained through an iterative process involving simulated system bus to ground admittances (self-admittances) in accordance with the algorithms and initial conditions hereinbefore described. Reference is now made to FIG. 9 which shows in block form a general bus to ground admittance representation. Shown in FIG. 9 is a typical system nodal point or bus 149 having a bus voltage E. A block 150 represents the admittance from bus 149 to ground, indicated as $G-jB$, where G is the bus to ground conductance and B is the bus to ground susceptance. The current I, shown flowing through the admittance 150 is the bus to ground current flowing from bus 149 to ground. Representing the voltage E and current I by their real and imaginary parts, the following equations hold for the current I in FIG. 9:

$$I^r = GE^r + BE^i$$

and $$I^i = -BE^r + GE^i$$

(26)

Figure 10:
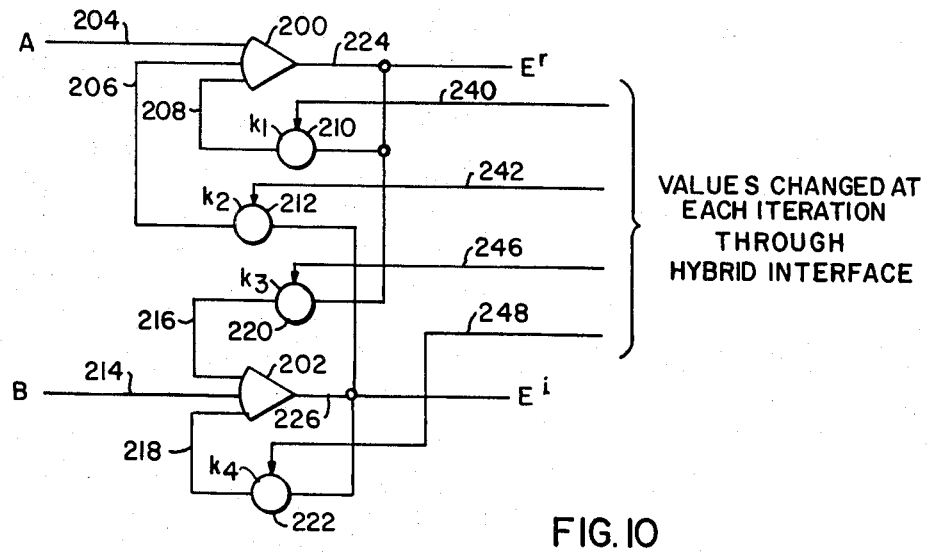
FIG. 10 sets forth in schematic form a general electric power system bus module representation.

Reference is now made to FIG. 10 which depicts in schematic form a minimum element bus simulation module circuit utilizing equations (26). As shown in FIG. 10, amplifiers 200 and 202 are high gain operational amplifiers each having three inputs and an output. Amplifier 200 has an output $E^r$ on output lead 224 representative of the real part of bus voltage E, and amplifier 202 has an output $E^i$ on output lead 226 representative of the imaginary part of the bus voltage E. Input to amplifier 200 are input signals A, $k_2E^i$ and $k_1E^r$ over input leads 204, 206 and 208 respectively. Input to amplifier 202 are input signals B, $k_3E^r$ and $k_4E^i$ over input leads 214, 216 and 218, respectively. The gains $k_1, k_2, k_3$ and $k_4$ are set through the employment of digital to analog multipliers (DAMs) or digital coefficient units (DCUs), and are designated by reference numerals 210, 212, 220 and 222, respectively. The values of $k_1, k_2, k_3$ and $k_4$ are set from the digital computer through a hybrid interface (not shown) over leads 240, 242, 246 and 248, respectively.

The analysis of the circuit of FIG. 10 for stability purposes employing Nyquist's Criterion is similar to that employed for the transmission line modules disclosed above with the following substitutions made:

Substitute
$E^r$ for $I^r$
$E^i$ for $I^i$
$G$ for $r$
$-B$ for $x$
$I^r$ for $U$
$I^i$ for $V$ With the above substitutions made, Tables III and IV below are analogous to Tables I and II above.

TABLE III

| CASE | A | B | $k_1$ | $k_2$ | $k_3$ | $k_4$ | loop gain |
|------|-----|-----|-----|-----|-----|-----|-----------|
| 1 | $I^r$ | $I^i$ | $-G$ | $-B$ | $B$ | $-G$ | $-B^2/G^2$ |
| 2 | $-I^r$ | $I^i$ | $G$ | $B$ | $B$ | $-G$ | $-B^2/G^2$ |
| 3 | $-I^r$ | $-I^i$ | $G$ | $B$ | $-B$ | $G$ | $-B^2/G^2$ |
| 4 | $I^r$ | $-I^i$ | $-G$ | $-B$ | $-B$ | $G$ | $-B^2/G^2$ |
| 5 | $I^i$ | $I^r$ | $B$ | $-G$ | $-G$ | $-B$ | $-G^2/B^2$ |
| 6 | $-I^i$ | $I^r$ | $-B$ | $G$ | $-G$ | $-B$ | $-G^2/B^2$ |
| 7 | $-I^i$ | $-I^r$ | $-B$ | $G$ | $G$ | $B$ | $-G^2/B^2$ |
| 8 | $I^i$ | $-I^r$ | $B$ | $-G$ | $G$ | $B$ | $-G^2/B^2$ |

TABLE IV

|  | 1 | 2 | 3 | 4 | 5 | 6 | 7 | 8 |
|---|---|---|---|---|---|---|---|---|
| $G>0$ $-B>0$ |  |  | OK |  |  | OK |  |  |
| $G>0$ $-B<0$ |  |  | OK |  |  |  |  | OK |
| $G<0$ $-B>0$ | OK |  |  |  |  | OK |  |  |
| $G<0$ $-B<0$ | OK |  |  |  |  |  |  | OK |

Again, as shown in Table IV above, for each choice of G and B there is a choice of two stable circuit implementations. It will be recalled from previous discussion that $G = P/E^2$ and $B = Q/E^2$ (equations (5) and (6)). Again, for practical stability reasons, it is recommended that for $\left|\dfrac{Q}{P}\right| < 1,$ implementations 1 or 3 from Table III be employed, and for $\left|Q/P\right| > 1,$ implementations 6 or 8 from Table III be employed.

Also recalling from previous discussion that the values of G and B are to be iterated during the load flow solution, it will be noted that the possibility exists that during the iterative process the ratio $|Q/P|$ may go from less than to greater than one (1), or vice-versa. Further for different load flows, the same bus could have different specified Q/P ratios. All this suggests a need for a more general implementation such as that shown in FIG. 11.

Figure 11:
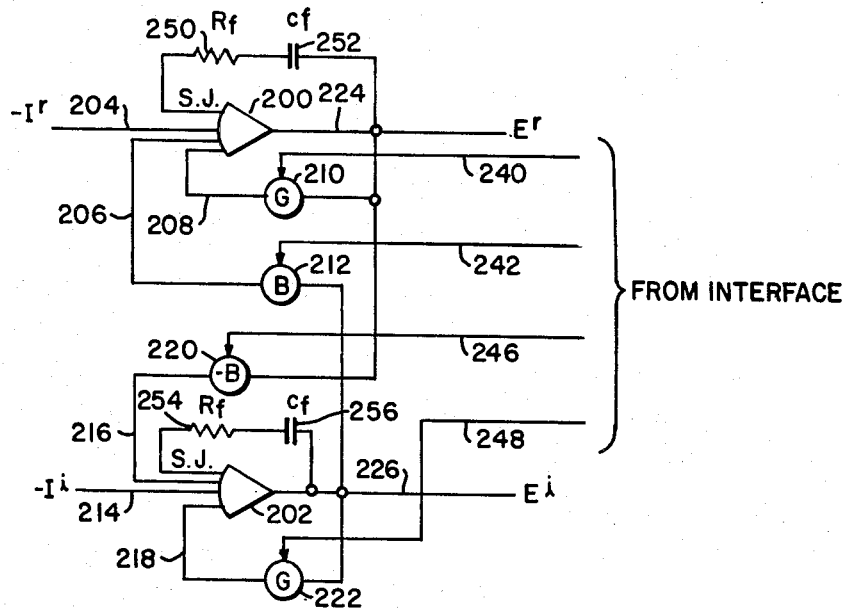
FIG. 11 depicts in schematic form a power system bus module with proportional plus integral control.

Reference is now made, therefore, to FIG. 11 which illustrates a stable bus simulation module circuit with proportional plus integral control. In particular, stable implementation case 3 of Table III is chosen. As shown, the circuitry of FIG. 11 is similar to that shown in FIG. 10 with $-I^r$, $-I^i$, G, B, $-B$ and G substituted for A, B, $k_1$, $k_2$, $k_3$ and $k_4$, respectively. One addition to the circuitry of FIG. 11, however, constitutes resistor-capacitor serial combinations across each of amplifiers 200 and 202. As will be seen, resistor 250 is serially connected to capacitor 252, the combination connected across amplifier 200, with one end of resistor 250 connected to the summing junction of amplifier 200 and one end of capacitor 252 connected to the output 224 of amplifier 200. Similar connections are made with respect to amplifier 202 and resistor 254 and capacitor 256. The addition of these resistor-capacitor combinations provides not only proportional but also integral control (proportional plus integral control) in the bus module circuitry. Under this type of control, low proportional gain is used for a high damped response, and the integral gain provided by the resistor-capacitor combinations is used to bring the steady state error towards zero, counteracting any great oscillatory effects due to changes in the Q/P ratio as previously indicated. The actual values of resistors 250, 254 ($R_f$) and capacitors 252, 256 ($C_f$) are chosen and adjusted on actual hardware for desired performance.

GENERATOR MODULES

As noted previously, the generator modules employed in the hybrid arrangement of FIG. 4 are switched out of the analog circuitry during load flow and replaced by a constant voltage source. It is during transient stability analysis study that the generator modules are switched into the analog circuitry. The choice of representation of a typical electric power system generator is a "constant voltage behind transient reactance" model of the type disclosed in previously filed Westinghouse Case W.E. 43,826, Ser. No. 255,048. A schematic diagram of a generator module of this type is set forth in FIG. 3. A description of the circuitry employed can be found in Appendix I of the present application.

THE HYBRID LOAD FLOW ARRANGEMENT

Returning now to FIG. 4, it will be recalled that there is shown a hybrid load flow computer arrangement employing the above-described transmission line and bus modules. As previously noted the analog portion of the hybrid arrangement is classified into three sections: transmission line modules, bus nodal equation circuitry and bus modules. The arrangement of FIG. 4 simulates the three bus system of FIG. 1 in the present embodiment but is not intended to be limiting in any way insofar as the size of the power system which can be represented is concerned.

The implementation of transmission line modules in FIG. 4 is chosen in the present embodiment to be a case 6 implementation as described above. Transmission line parameters for a case 6 implementation are as follows:

$A = -V = -E_j^I + E_k^R;\ B = U = E_j^i - E_k^i;\ k_1 = x;\ k_2 = r;\ k_3 = -r;\ k_4 = x;$ where:

$r > 0$ and $x > 0$.

Bus parameters are preferably chosen for a case 3 implementation and are as follows:

$A = -I^r;\ B = -I^i;\ k_1 = G;\ k_2 = B;\ k_3 = -B;\ k_4 = G;$ where:

$G > 0$ and $-B > 0$.

As will be seen from viewing FIG. 4, modules 350, 351 and 352 represent the series branch admittances $\overline{Y}_{12}$, $\overline{Y}_{23}$ and $\overline{Y}_{13}$ of the transmission lines of FIG. 1. The module 350 includes high gain operational amplifiers 400 and 402. Amplifier 400 produces an output $I_{L12}^R$ at lead 480, while amplifier 402 produces an output $I_{L12}^I$ at lead 482. The parameters $I_{L12}^R$ and $I_{L12}^I$ represent real and imaginary components of the current $I_{L12}$ flowing from bus 11 to bus 12 through admittance $\overline{Y}_{12}$ in FIG. 1. Calculation of the input parameters to amplifiers 400 and 402 in accordance with case 6 implementation parameter values of A, B, $k_1$, $k_2$, $k_3$ and $k_4$ is as follows:

$$A = -V = -E_j{}^I + E_k{}^I = -0 + E_2{}^I$$
$$B = U = E_j{}^R - E_k{}^R = E_1{}^R - E_2{}^R$$
$$k_1 = X_{jk} = X_{12}$$
$$k_2 = R_{jk} = R_{12}$$
$$k_3 = R_{jk} = -R_{12}$$
$$k_4 = X_{jk} = X_{12}$$

where:

$j = 1$ and $k = 2$ for buses 11 and 12 of FIG. 1, respectively.

Accordingly, input $A=E_2{}^I$ is delivered to amplifier 400 over lead 411. Also input to amplifier 400 is $k_1 I_{L12}{}^R = X_{12} I_{L12}{}^R$, from output 480 through a potentiometer 460 set to have a value $X_{12}$, over lead 415. And also input to amplifier 400 is $k_2 I_{L12}{}^I = R_{12} I_{L12}{}^I$, from output 482 through a potentiometer 461, set to have a value $R_{12}$, over lead 413. Input $B = E_1{}^R - E_2{}^R$ is delivered to amplifier 402 over leads 417a (which carries signal $E_1{}^R$) and 417b (which carries signal $-E_2{}^R$). Also input to amplifier 402 is $k_3 I_{L12}{}^R = -R_{12} I_{L12}{}^R$, from output 480 through an inverter 450 (to a negative unity gain) through a potentiometer 463, set provide to have a $R_{12}$, over lead 418. And also input to the amplifier 402 is the input $k_4 I_{L12}{}^I = X_{12} I_{L12}{}^I$ from output 482 through a potentiometer 464, set to have a value $X_{12}$ over lead 419.

The module 351, for representing the transmission line series branch admittance $Y_{23}$ between buses 12 and 13 of FIG. 1, includes high gain operational amplifiers 404 and 406. Amplifier 404 produces an output $-I_{L23}{}^R$ at lead 486, while amplifier 406 produces an output $-I_{L23}{}^I$ at lead 488. The parameters $-I_{L23}{}^R$ and $-I_{L23}{}^I$ are the negative real and imaginary components of the current $I_{L23}$ flowing from bus 12 to bus 13. It is desired to calculate the negative real and imaginary components of the current $I_{L23}$ since positive components of that current are not necessary for the load flow solution in the present embodiment. Hence, parameters A and B must also be expressed in the negative. Therefore, with respect to amplifiers 404 and 406, negative case 6 implementation parameters are as follows:

$$-A = V = E_j{}^I - E_k{}^I = E_2{}^I - E_3{}^I$$
$$-B = -U = -E_j{}^R + E_k{}^R = -E_2{}^R + E_3{}^R$$
$$k_1 = X_{jk} = X_{23}$$
$$k_2 = R_{jk} = R_{23}$$
$$k_3 = -R_{jk} = -R_{23}$$
$$k_4 = X_{jk} = X_{23}$$

where:

$j=2$ and $k=3$ for buses 12 and 13 of FIG. 1, respectively.

Accordingly, $E_2{}^I - E_3{}^I$ is delivered as an input to amplifier 404 over leads 421a (which carries signal $E_2{}^I$) and 421b (which carries signal $-E_3{}^I$). Also input to amplifier 404 is the signal $-k_1 I_{L23}{}^R = -X_{23} I_{L23}{}^R$, from output 486 through a potentiometer 466 set to have a value $X_{23}$, over lead 423. And also input to amplifier 404 is the signal $-k_2 I_{L23}{}^I = -R_{23} I_{L23}{}^I$ from output 488 through a potentiometer 467, set to have a value $R_{23}$ over lead 422. Input $-B = -E_2{}^R + E_3{}^R$ is delivered to amplifier 406 over leads 425a (which carries signal $-E_2{}^R$) and 425b (which carries signal $E_3{}^R$). Also input to amplifier 406 is the signal $k_3 I_{L23}{}^R = R_{23} I_{L23}{}^R$ from output 486 through inverter 452 (to provide a negative unity gain) through a potentiometer 470, set to have a value $R_{23}$, over lead 426. And also input to amplifier 406 is the signal $-k_4 I_{L23}{}^I = X_{23} I_{L23}{}^I$ from output 488 through a potentiometer 471, set to have a value $X_{23}$, over lead 427.

The module 352 for representing the transmission line series branch impedance $\overline{Y}_{31}$ between buses 13 and 11 of FIG. 1 includes high gain operational amplifiers 408 and 410. Amplifier 408 produces an output $I_{L31}{}^R$ at lead 492 while amplifier 410 produces an output $I_{L31}{}^I$ at lead 494. The parameters $I_{L31}{}^R$ and $I_{L31}{}^I$, are the real and imaginary components of the current $I_{L31}$ flowing from bus 13 to bus 12. Calculation of the input parameters to amplifiers 408 and 410 in accordance with the case 6 implementation are as follows:

$$A = -V = -E_j{}^I + E_k{}^I = -E_2{}^I + E_1{}^I = -E_3{}^I + 0$$
$$B = U = E_j{}^R - E_k{}^R = E_3{}^R - E_1{}^R$$
$$k_1 = X_{jk} = X_{31}$$
$$k_2 = R_{jk} = R_{31}$$
$$k_3 = -R_{jk} = -R_{31}$$
$$k_4 = X_{jk} = X_{31}$$

where:

$j = 3$ and $k = 1$ for buses 13 and 11 of FIG. 1, respectively.

Accordingly, input $A = -E_3{}^I$ is delivered to amplifier 408 over lead 430. Also input to amplifier 408 is the signal $k_1 I_{L31}{}^R = X_{31} I_{L31}{}^R$, from output 492 through a potentiometer 473, set to have a value $X_{31}$, over lead 432. And also input to amplifier 408 is the signal $k_2 I_{L31}{}^I = R_{31} I_{L31}{}^I$, from output 494 through a potentiometer 474, set to have a value $R_{31}$, over lead 431. Input $B = E_3{}^R - E_1{}^R$ is delivered to the amplifier 410 over leads 435 (which carries the signal $E_3{}^R$) and 436 (which carries the signal $-E_1{}^R$). Also input to the amplifier 410 is the signal $k_3 I_{L31}{}^R = -R_{31} I_{L31}{}^R$, from output 492 through an inverter 454 (to provide negative unity gain) through a potentiometer 477, set to have a value $R_{31}$, over lead 437. And also input to amplifier 410 is the signal $k_4 I_{L31}{}^I = X_{31} I_{L31}{}^I$ from output 494 through a potentiometer 478, set to have a value $X_{31}$ over lead 438.

Summarizing the outputs from transmission line modules 350, 351 and 352 are $I_{L12}{}^R$ and $I_{L12}{}^I$ over leads 480 and 482 $-I_{L23}{}^R$ and $-I_{L23}{}^I$ over leads 486 and 482 and $I_{L31}{}^R$ and $I_{L31}{}^I$ over leads 492 and 494, respectively. These current outputs are delivered to the bus nodal equation portion of the analog circuitry of FIG. 4 for calculation of net bus currents flowing to buses 11, 12 and 13 of FIG. 1.

Applying Kirchoff's current law to each of the buses of FIG. 1, it will be appreciated that for bus 11 the net current flow $I_{L1} = I_{L31} - I_{L12} = (I_{L31}{}^R - I_{L12}{}^R) + (I_{L31}{}^I - I_{L12}{}^I) = I_{L1}{}^R + I_{L1}{}^I$. For bus 12 the net current flow $I_{L2} = I_{L12} - I_{L23} = (I_{L12}{}^R - I_{L23}{}^R) + (I_{L12}{}^R - I_{L23}{}^R) + (I_{L12}{}^I - I_{L23}{}^I) = I_{L2}{}^R + I_{L2}{}^I$. And for bus 13 the net current flow $I_{L3} = I_{L23} - I_{L31} = (I_{L23}{}^R - I_{L31}{}^R) + (I_{L23}{}^I - I_{L31}{}^I) = I_{L3}{}^R + I_{L3}{}^I$.

The bus nodal equation portion of the analog circuitry in the hybrid computer arrangement of FIG. 4 receives as inputs the currents $I_{L12}{}^R$, $I_{L12}{}^I - I_{L23}{}^R$, $-I_{L23}{}^I$, $I_{L31}{}^R$ and $I_{L31}{}^I$, over leads 480, 482, 486, 488, 492 and 494, respectively, for the generation of bus current components $I_{L1}{}^R$, $I_{L1}{}^I$, $I_{L2}{}^R$, $I_{L2}{}^I$, $I_{L3}{}^R$ and $I_{L3}{}^I$. Included in the nodal circuitry are summation amplifiers 500, 502, 504, 506, 508 and 510 (each having a unity inversion gain), as well as inverters 512 and 514. The amplifier 500 receives as inputs the current $I_{L12}{}^R$ over lead 480, and the current $-I_{L31}{}^R$ over lead 492 through inverter 512, and generates an output $I_{L31}{}^R - I_{L12}{}^R = I_{L1}{}^R$ at lead 360. Amplifier 502 receives as inputs the current $I_{L12}{}^I$ over lead 482 and the current $-I_{L31}{}^I$ over lead 494 through inverter 514 and generates an output $I_{L31}{}^I - I_{L12}{}^I = I_{L1}{}^I$ at lead 361. Amplifier 504 receives as inputs the current $I_{L12}{}^R$ over lead 480, and the current $-I_{L23}{}^R$ over lead 486, and generates an output $I_{L23}{}^R - I_{L12}{}^R = -I_{L2}{}^R$ over lead 362. Amplifier 506 receives as inputs the current $I_{L12}{}^I$ over lead 482, and the current $-I_{L23}{}^I$ over lead 488 and generates an output $I_{L23}{}^I - I_{L12}{}^I = -I_{L2}{}^I$. Amplifier 508 receives as inputs the current $-I_{L23}{}^R$ over lead 486, and the current $I_{L31}{}^R$ over lead 492 and generates an output $I_{L23}{}^R - I_{L31}{}^R = I_{L3}{}^R$ over lead 364. And amplifier 510 receives as inputs the current $-I_{L23}{}^I$ over lead 488, and the current $I_{L31}{}^I$ over lead 494 and generates an output $I_{L23}{}^I - I_{L31}{}^I = I_{L3}{}^I$ over lead 365.

The bus module portion of the analog part of the hybrid computer arrangement of FIG. 4 receives the currents $I_{L1}{}^R$, $I_{L1}{}^I$, $-I_{L2}{}^R$, $-I_{L2}{}^I$, $I_{L3}{}^R$ and $I_{L3}{}^I$ over leads 360, 361, 362, 363, 364 and 365, respectively, as computational inputs, and produces as outputs real and imaginary components of system bus voltages. In the embodiment shown in FIG. 4, the aforementioned case 3 implementation is employed with $G>0$ and $-B>0$ for bus modules 356 and 357 which simulate system buses 12 and 13 of FIG. 1, respectively. Since bus 11 of FIG. 1 was chosen to be a system slack or reference, i.e. a bus having a constant voltage magnitude at zero angle no modular representation is employed for bus 11. Bus 11 is represented rather by a constant voltage source 600 having a slack bus voltage $E_s = V_1 \angle^\circ$ during the load flow solution. Once the load flow solution has been attained, bus 11 is converted to a generator bus via switching arrangement 599 which breakes contact with the voltage source 600, and makes contact with the generator model 100 to provide real and imaginary components of bus voltage at bus 11, $E^R$, and $E^I$ after a load flow solution has been reached. Accordingly, currents $I_{L1}{}^R$ and $I_{L1}{}^I$ over leads 360 and 361 are employed only as inputs to the generator model 100 during transient stability studies (the operation of generator model 100 is explained in Appendix II), aside from being converted and employed for digital calculations.

A description of bus modules 356 and 357 will now ensue. As previously noted the above-described case 3 implementation is employed. It will be recalled from Table III that for a case 3 implementation of bus modules:

$A = -I_j{}^r$; $B = -I_j{}^i$; $k_1 = G_{jj}$; $k_2 = B_{jj}$; $k_3 = -B_{jj}$; and $k_4 = G_{jj}$ where:

$j$ is representative of the $j^{th}$ bus of the power system. Substituting the above parameters for bus module 356, representative of bus 12 in FIG. 1 ($j=2$):

$A = -I_{L2}{}^R$; $B = -I_{L2}{}^I$; $k_1 = G_{jj} = G_{22}$; $k_2 = B_{22}$; $k_3 = -B_{22}$; and $k_4 = G_{22}$ Accordingly, module 356 includes high gain operational amplifiers 610 and 612. Amplifier 610 produces an output signal $E_2{}^R$ at lead 662 which is the real component of bus voltage at bus 12 of FIG. 1 while amplifier 612 produces an output $E_2{}^I$ at lead 668 which is the imaginary component of bus voltage at bus 12. Input $A = -I_{L2}{}^R$ is delivered to amplifier 610 over lead 362. Also input to the amplifier 610 is the signal $k_1 E_2{}^R = G_{22} E_2{}^R$ from output 662 through a Digital-Analog Multiplier (DAM) 620, set to have a value $G_{22}$, over lead 370.

And also input to the amplifier 610 is a signal $B_{22} E_2{}^I$ from output 668 through a DAM 624 set to have a value $B_{22}$ over lead 371. Input $B = -I_{L2}{}^I$ is delivered to amplifier 612 over lead 363. Also input to the amplifier 612 is a signal $-B_{22} E_2{}^R$ from output 662 through a DAM 622 set to have a value $-B_{22}$ over lead 373. And also input to the amplifier 612 is a signal $G_{22} E_2{}^I$ from output 668 through a DAM 626, set to have a value $G_{22}$, over lead 372.

Additionally, input to amplifier 610 is an initial condition voltage $-E_s$, set through a potentiometer 602. It will be recalled from previous discussion that the choice of initial conditions on bus voltages was such that the slack bus (bus 11) voltage $E_s$ would be input to each of the other bus modules. Since the slack bus voltage is at zero angle, only real component voltages are inputs.

Turning now to the bus module 357, that module included high gain operational amplifiers 614 and 616. Amplifier 614 produces an output $E_3{}^R$ at lead 670 which is the real component of bus voltage at bus 13 of FIG. 1, while amplifier 616 produces an output signal $E_3{}^I$ at lead 674 which is the imaginary component of bus voltage at bus 13 of FIG. 1. The input parameter for bus module 357 are the same as for module 356 except that subscript $j$ now equals three (3). Accordingly, input $A = -I_{L3}{}^R$ is delivered to amplifier 614 from lead 364 through an inverter 520 (to invert the signal $I_{L3}{}^R$). Also input to the amplifier 614 is a signal $G_{33} E_3{}^R$ from output 670 through a DAM 628 set to have a value $G_{33}$ over lead 374. And also input to the amplifier 614 is a signal $B_{33} E_3{}^I$ from output 674 through a DAM 632 set to have a value $B_{33}$, over lead 375. Input $B = -I_{L3}{}^I$ is delivered to the amplifier 616 over lead 365 through an inverter 522 (to invert the signal $I_{L3}{}^I$). Also input to the amplifier 616 is a signal $-B_{33} E_3{}^R$ from output 670, through a DAM 630, set to have a value $-B_{33}$, over lead 377. And also input to the amplifier 616 is a signal $G_{33} E_3{}^I$ from output 674, through a DAM 634, set to have a value $G_{33}$, over lead 376.

The initial condition voltage input for bus module 357 is delivered as signal $-E_s$ to amplifier 614 through a potentiometer 604.

The values $G_{22}$, $B_{22}$, $-B_{22}$ and $G_{22}$ for DAM's 620, 622, 624 and 626, respectively and the values $G_{33}$, $B_{33}$, $-B_{33}$ and $G_{33}$ for DAM's 628, 630, 632 and 634, respectively, are digitally set by the digital portion of the hybrid arrangement of FIG. 4 over connection 690, in accordance with previously described initial conditions and load flow algorithms for the load flow solution. In the present embodiment the digital portion of the hybrid arrangement includes a teletype device 300 connected for input information to a digital computer 304, which may be of the W2500 class. Also connected to the digital computer 304 is an output printer 302 for printing information from the digital computer 304.

The digital computer 304 is interfaced with the outputs of the bus nodal equation and bus module portions of the analog part of the hybrid arrangement through an interface portion 306. The interface 306 includes digitalanalog devices 307 for converting digital information consisting of values for the setting of bus module DAM's (bus to ground admittance values) to analog form and delivering the analog values over connection 690. Also included in the interface 306 is an analog-digital multiplexer 309 which receives net bus currents from the bus nodal equation outputs over connection 308 and converts the analog information received to digital form for entry into the digital computer 304 to obtain a load flow solution in accordance with the iterative process employing previously described load flow solution algorithms.

FLOW CHART FOR LOAD FLOW SOLUTION EMPLOYING HYBRID COMPUTER ARRANGEMENT OF PRESENT INVENTION

Figure 12:
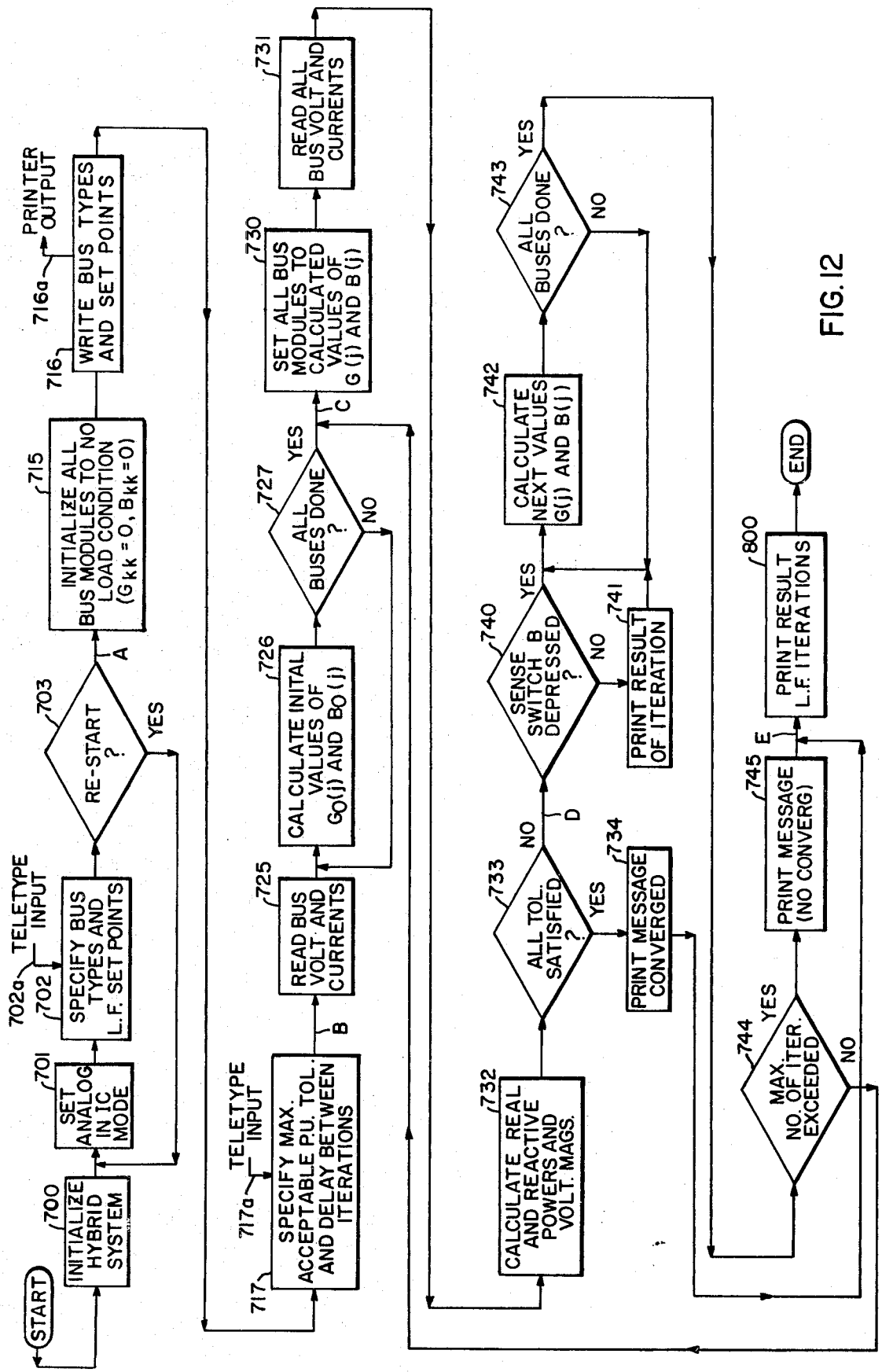
FIG. 12 illustrates a flow chart for the hybrid load flow solution employing the hybrid arrangement of the present invention.

Reference is now made to FIG. 12, which depict a flow chart employed with respect to the hybrid arrangement of FIG. 4 for convergence of the system load flow solution. Particularly shown is starting block 700 which begins the load flow solution program. The block 700 feeds into block 701, which sets the analog circuitry in its initial condition mode (IC Mode). In the initial condition mode all bus voltages for the analog bus modules are set equal to the swing bus voltage, $E_s$. The block 701 then feeds to block 702 which calls for the specification of system bus types and load flow set points. As previously described, the bus types chosen for load flow solution purposes herein are swing, load and voltage regulated bus with set points of voltage magnitude and angle, active and reactive power, and voltage magnitude, and active power respectively. Specifications may be entered by teletype as represented by teletype input 702a. The block 702 feeds to a decision block 703 which decides whether a restart of the program is necessary due to teletype errors or the like. If a restart is necessary, block 703 feeds back to block 701. If not, block 703 feeds to program point "A."

Under program point "A" the system bus modules are initialized to no load conditions by block 715. That is, the bus to ground susceptances and conditions are set equal to zero ($G_{jj} = 0$, $B_{jj} = 0$). The block 715 feeds to a block 716 which writes the system bus types and set points via a printer output 716a. Next, block 716 feeds a block 717 which specifies via teletype input 717a, the maximum acceptable per unit (with respect to some voltage or power as given by the particular utility company involved) tolerances (related to system set points) and time delay between iterations in milliseconds. Block 717 then feeds to program point "B".

Under program point "B," the real and imaginary components of system simulated bus voltages and net bus currents are read into the digital computer through analogdigital channels as represented by block 725. Next, block 725 feeds to a block 726 which calculates initial values of bus to ground susceptances and conductances ($G_o(j)$ and $B_o(j)$) for each bus in the power system in accordance with previously derived equations (7) and (18) herein for load and voltage regulated buses, respectively. Block 726 feeds to a decision block 727 which asks whether initial conditions on the bus to ground admittances have been implemented on all system buses. If the answer is "no" then block 727 feeds back to block 726 until all buses have their initial bus to ground admittance values set. If the answer is "yes," block 727 feeds to program point "C."

Under program point "C" block 730 represents the setting of all bus modules in the analog portion of the hybrid arrangement with their calculated initial condition values of susceptances and conductances ($G(j)$ and $B(j)$).

Block 730 feeds to block 731, which, after a specified time delay reads from the analog portion of the hybrid arrangement all bus voltages and net currents after the $i^{th}$ iteration. From block 731, block 732 digitally calculates real and reactive powers and voltage magnitudes for each bus in the power system in accordance with ordinary power and voltage equations.

After calculation of real and reactive powers and voltage magnitudes block 732 feeds to a decision block 733 which asks whether the tolerances specified in block 717 have been satisfied. If the answer is yes, then block 733 feeds to block 734 which prints a message that the load flow solution has converged and feeds to program point "E" under which a block 800 prints the result of the load flow iteration, which in this case would be the load flow solution. If the tolerances of block 717 are not satisfied, decision block 733 then feeds to a program point "D."

Under program point "D," a decision block 740 asks whether a sense switch in the analog portion (not shown) has been depressed. If the answer is "no," then block 740 feeds to a block 741 which prints the results of the non-convergent iteration and then feeds block 742. If the sense switch has been depressed, block 740 feeds directly to block 742 without calling for the printing of the non-convergent iteration. Block 742 calculates the next values of $G(j)$'s and $B(j)$'s for the present iteration in accordance with previously derived equations (8), (10), (13), (15), (17), (9), (11) and (15) for load buses and in accordance with equations (20), (9), (12), (14) and (16) for voltage regulated buses. Block 742 next feeds to a decision block 743.

Decision block 743 asks whether calculations of block 742 have been completed for all system buses. If the answer is "no" block 743 feeds back to block 742 for further calculations. When all buses are done the answer from block 743 will be yes and block 743 will feed to decision block 744.

Decision block 744 asks whether a preselected maximum number of iterations (chosen according to system time allowed) has been exceeded. If the answer is yes no further calculations are performed and block 744 feeds to a block which prints a message that the load flow solution has not converged and then feeds to program point "E" for the printing of the result of the last load flow iteration. If the maximum number of iterations has not been exceeded, block 744 feeds back to program point "C," and the system bus modules have their calculated admittances set and the next iteration is carried out. The iterative process continues until a load flow solution has been converged or until the maximum number of iterations has been exceeded. A listing of a digital computer program for executing the steps depicted by the flow chart shown in FIG. 12 appears under the heading "APPENDIX II".

APPENDIX I

Figure 13:
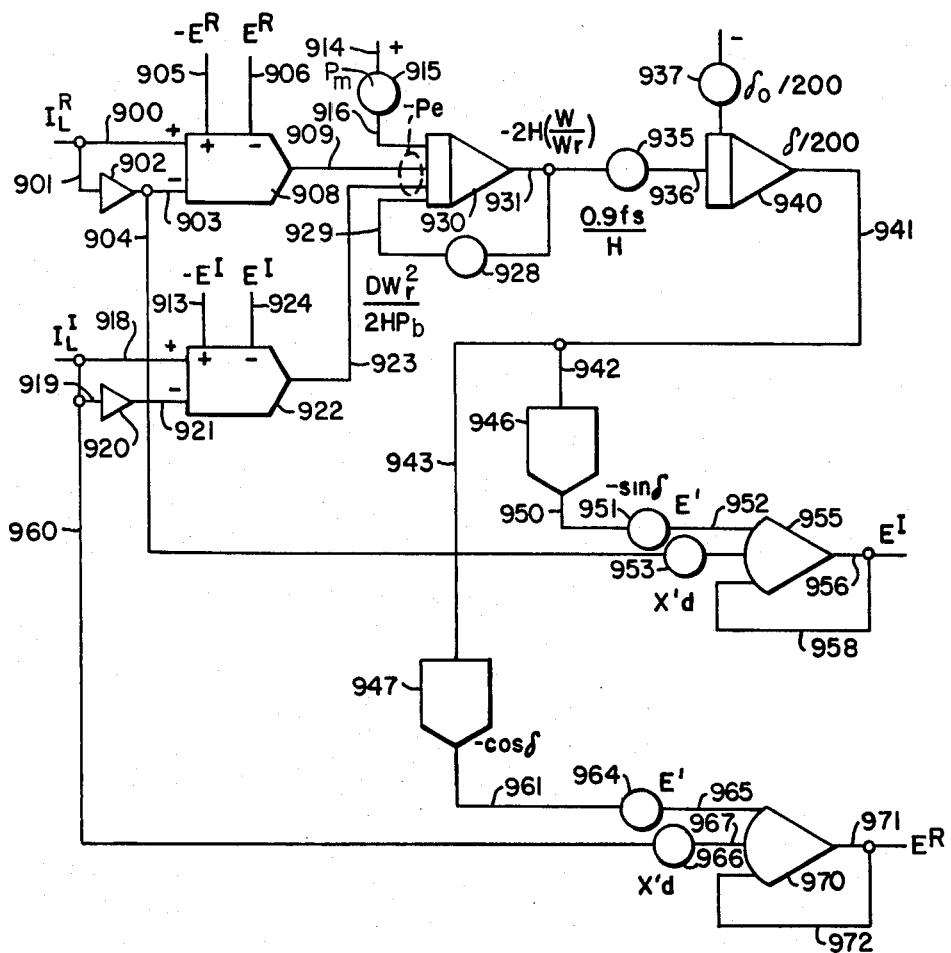
FIG. 13 depicts in schematic form a generator model employed for representing an electric power system generator for transient stability analysis.

Description of Generator Model Using Constant Voltage Behind Transient Reactance Model With reference to the module depicted in FIG. 13, the following quantities are defined:

| | |
|---|---|
| $T_m$: | Net mechanical torque input to generator rotor shaft (Nm.) |
| $P_m$: | Net mechanical power input to rotor shaft (per unit) |
| $T_e$: | Net electrical torque on rotor shaft (Nm.) |
| $P_e$: | Net electrical power output of generator (per unit) |
| $P_b$: | Base MVA |

-Continued

| | |
|---|---|
| $f_s$: | Generator supply frequency (Hertz) |
| $W_r$: | Nominal rotor speed (mech. rad/sec.) |
| $W$: | Deviation of generator rotor speed around $W_r$ (mech. rad/sec.) |
| $J$: | Rotor inertia (kg.–m²) |
| $H$: | Inertia constant of generator define as stored rotor energy at rated speed (MW-sec.) / Base MVA |
| $D$: | Damping coefficient linearized for small w (Nm-sec.) |
| $\overline{E}$: | Phasor terminal voltage of the generator $= E^R + jE^I$ (per unit) |
| $\overline{I}_L$: | Phasor current into the generator bus from the transmission lines $= I_L^R + jI_L^I$ (per unit) |
| $X_d'$: | D– axis transient reactance (per unit) |
| $\overline{E}'$: | Phasor voltage behind transient reactance (per unit) |
| $\delta$: | Phase angle of $\overline{E}'$ with respect to that of the swing bus voltage (elect. degrees) |
| $\delta_o$: | Value of $\delta$ at the beginning of the transient (elect. degrees) |

For small $w$, $$T_m - T_e = Jw + Dw.$$

Multiplying through by $W_r/P_b$, $$\frac{W_r T_m}{P_b} - \frac{W_r T_e}{P_b} = \frac{2\frac{1}{2} J W_r^2}{P_b}\left(\frac{\dot{w}}{W_r}\right) + \frac{D W_r^2}{P_b}\left(\frac{w}{W_r}\right)$$

or, $$P_m - P_e = 2H\left(\frac{\dot{w}}{W_r}\right) + \frac{D W_r^2}{W_r}\left(\frac{w}{W_r}\right) \quad (1A)$$

The phase angle $\delta$ is the same as the angle between the q-axis of the generator rotor and the corresponding axis for the swing bus, expressed in electrical degrees. Thus, $$\delta = \delta_o + \frac{180}{\pi} \cdot \frac{2\pi f_s}{W_r} \int_0^t w\, dt$$

$$= \delta_o + 360 f_s \int_0^t \left(\frac{w}{W_r}\right) dt \quad (2A)$$

Also $$P_e = -(E^R I_L^R + E^I I_L^I) \quad (3A)$$

$$E_R = E' \cos\delta - I_L' X_d' \quad (4A)$$

$$E^I = E' \sin\delta + I_L^R X_d' \quad (5A)$$

FIG. 13 shows in schematic form the circuit implementation of equations (1A)–(5A) above. The mechanical power, $P_m$, is generated through a potentiometer 915 connected to a positive terminal of a power source (not shown) through lead 914. The electrical power, $P_e$, is generated through the employment of two multipliers 908 and 922. Input to multiplier 908 is the real component of net bus current $I_L^R$ over lead 900. The negative of the real component net bus current $(-I_L^R)$ is also input to multiplier 908 over lead 901 through an inverter 902 and lead 903. Also input to multiplier 908 is the real component of bus voltage $E^R$ over lead 906, as well as the negative of the real component of bus voltage $(-E^R)$ over lead 905. The output 909 of multiplier 908 is a signal, $E^R I_L^R$.

Input to multiplier 922 is the imaginary component of net bus current $I_L^I$ over lead 918. Also input to multiplier 922 is the negative of the imaginary component of net bus current $(-I_L^I)$ over lead 919 through an inverter 920 and lead 921. And also input to the multiplier 922 is the imaginary component of bus voltage, $E^I$, over lead 924, as well as the negative of the imaginary component of bus voltage $(-E^I)$ over lead 913. The output 923 of multiplier 922 is a signal $E^I I_L^I$.

The quantity $P_m - P_e$ is input to an integrator 930 over leads 916, 909 and 923. Also input to integrator 930 is a feedback signal $$D\frac{W_r^2}{P_b}\left(\frac{W}{W_r}\right)$$

from output 931 of integrator 930 through a potentiometer 928 having a value of $$D\frac{W_r^2}{2HP_b}$$

over lead 929. The output 931 carries a signal $$-2H\left(\frac{W}{W_r}\right)$$

which is the negative integral of the input $$P_m - P_e - \frac{DW_r^2}{P_b}\left(\frac{W}{W_r}\right), \text{ or } 2H\left(\frac{\dot{W}}{W_r}\right)$$

from equation (1A).

The output $-2H\left(\frac{W}{W_r}\right)$ of integrator 930 is fed via lead 931 and potentiometer 935, as input 936 to integrator 940. The potentiometer 935 has a value $$\frac{0.9 f_s}{H}$$

and the input 936 is a signal $$\frac{360}{200} f_s \left(\frac{W}{W_r}\right) = 1.8 f_s \frac{W}{W_r}.$$

Also input to the integrator 940 is the initial condition signal $\delta_o/200$ from a power source (not shown) through a potentiometer 937. The output of integrator 940 on lead 941 is the signal $$\delta_o/200 + \frac{360}{200} f_s \int_0^t \frac{W}{W_r} = \delta/200$$

(equation 2A) divided by scaling factor of 200).

The output 941 from integrator 940 is delivered to resolving devices 946 and 947 over leads 942 and 943, respectively. The resolving device 946 has an output 950 of $-\sin \delta$. The output $-\sin \delta$ is fed through a potentiometer 951 having a gain $E'$ and the signal $-E' \sin \delta$ is input to an operational amplifier 955 on a lead 952. Also input to operational amplifier 955 is the signal $-X_d' I_L^R$ from lead 904 through a potentiometer 953 having a value $X_d'$. And also input to amplifier 955 is a feedback signal $E^I$ from output 956 of amplifier 955 over lead 958. The amplifier circuit 955 satisfies equation (4A).

The resolver device 947 has an output 961 which carries a signal $-\cos \delta$. The signal $-\cos \delta$ is fed through a potentiometer 964 having a value of $E'$ and the signal $-E' \cos \delta$ is input to operational amplifier 970 over lead 965. Also input to amplifier 970 is the signal $X_d' I_L^I$ over lead 967 from lead 960 through a potentiometer 966 set to have a value $X_d'$. And also input to amplifier 970 is a feedback signal $E^R$, from output 971 over lead 972. The amplifier circuit 970 satisfies equation (5A).

It is the generator phase angle $\delta$ on lead 941 that is studied during transient stability analysis.

APPENDIX II

Program Listing

```
C POWER SYSTEM HYBRID SIMULATION      ELECTROMECHANICAL SYSTEMS W R&D
C                               A H PRADHAN / F S MARTON
C       PART ONE - LOAD FLOW
C       DESIGNATION NUMBER FOR BUSSES:
C       CONSTANT POWER           TYPE 1
C       CONSTANT IMPEDANCE       TYPE 2
C       CONSTANT VOLTAGE         TYPE 3
C       CONSTANT CURRENT         TYPE 4
C       SWING BUSS               TYPE 5
C
C       SENSE SWITCH A     INITIALIZE CONSOLE AND START AGAIN
C       SENSE SWITCH B     SKIPS ALL PRINTING DURING ITERATIONS
C       CONTROL LINE 0     TRUE=RECORDER ON,  FALSE = RECORDER OFF
C
        DIMENSION ER(3),EI(3),ADC(24),P(3),Q(3),G(3),B(3),FRS(3),FIS(3),
       1ABSE(3),TBUS(5),DAC(16),PREVE(3),PREVQ(3),PREVP(3)
        INTEGER T ( 3),DELAY
        REAL IR(3),II(3),IRJ,IIJ,IJ
        LOGICAL SENSW, SWB,ENDIT
        EQUIVALENCE (ADC(1),ER(1)),(ADC(7),EI(1)),(ADC(13),IR(1)),
       1(ADC(19),II(1))
        DATA TBUS(1),TBUS(2),TBUS(3),TBUS(4),TBUS(5)/3HPWR,3HIMP,4HVOLT,
       14HCUR,4HSWING/
        CALL QSHYIN (KE,680,680)
        WRITE(1,100)
100     FORMAT(//29HPOWER SYSTEM HYBRID LOAD FLOW/)
        CALL QSC(0,KE)
        CALL QSC(1,KE)
        CALL QSRUN(KE)
5       CALL QSIC(KE)
        WRITE(16,106)
106     FORMAT(1H1////)
C       N IS THE NUMBER OF BUSSES INCLUDING SWING BUS
25      N = 3
        CALL QWCLL(00,.FALSE.,KE)
        NM=6                                                    VM=2*N
        T(1) = 5

FRS(1) = .0
        FIS(1) = .0
        RADIAN=180.0/3.14159
        WRITE(1,101)
101     FORMAT(32HINPUT BUS TYPE, REAL SP, IMAG SP)
        DO 6 JK=2,N
        WRITE(1,113)JK
113     FORMAT(7H BUS = I2/)
        READ(2,102) T(JK),FRS(JK),FIS(JK)
102     FORMAT(  I3,2F10.0)
        IF(SENSW(1))GO TO 5
C                                                       INITIALIZE DACS
        DO 20 J=1,8
20      DAC(J)=0.0
        CALL QWBDAR(DAC,4,8  ,KE)
        CALL QSTDA
        CALL QSOP(KE)
        KS = T(JK)
        WRITE(1,   94)TBUS(KS),FRS(JK),FIS(JK)
94      FORMAT(2XA4,   F8.4,F8.4)
6       CONTINUE
        WRITE(1,103)
```

```
103     FORMAT(25H TOL,DELAY ?'/)
        READ(2,104)TOL,DELAY
104     FORMAT( F10.0,I7)
        CALL QRBADR(ADC,0,7,KE)
        SWGESQ=ER(1)**2+EI(1)**2
        SWNGE=SQRT(SWGESQ)
C                                                                   INITIALIZE B & G
117     DO 15 J =1,N
        PREVE(J)=SWNGE
        IF (T(J) .EQ.3) GO TO 14
        G(J) = FRS( J)/SWGESQ
        B(J) = FIS( J)/SWGESQ
        PREVP(J)=0.0
        GO TO 15
14      G(J)=FRS(J)/FIS(J)**2
        B(J)=0.0
        PREVQ(J)=0.0
15      CONTINUE
C                                                                   TURN RECORDER ON
        CALL QWCLL(00,.TRUE.,KE)
        ENDIT=.FALSE.
        SWB=.FALSE.
        IF(SENSW(2))SWB=.TRUE.
C                                                                   WAIT 1 SEC.
        CALL QSDLY(1000)
C                                                                   ALLOW ONLY'MAXI'ITERATIONS
        MAXIT=21
        IF(SWB)GO TO 124
        WRITE(16,124)
124     FORMAT(120H TYPE       PJ       QJ       G(J)       B(J)
       1 EJ       ITER')
        M = 0
        DO 75 ITERATE=1,MAXIT
        NOFIT=ITERAT-1
C                                                                   BEGIN ITERATION LOOP
C .                                                                 ONLY TWO BUSSES CAN BE SIMULA-
C                                                                   TED WITH 8 DAMS
        DAC(2)=-G(2)
        DAC(1)=DAC(2)
        DAC(3)=-G(3)
        DAC(4)=DAC(3)
        DAC(6)=B(2)
        DAC(5)=-DAC(6)
        DAC(7)=-B(3)
        DAC(8)=B(3)
C                                                                   THE SIGN CHANGES ARE TO OBTAIN THE PROPER
C                                                                   OUTPUTS FROM THE DAMS,
        CALL QWBDAR(DAC,4,12,KE)
        CALL QSTDA
        M=0
        CALL QSDLY(DELAY)
        CALL QRBADR(ADC,0,24,KE)
208     DO 1008 J=1,N,1
        XR = ABS(FRS(J))
        XR = AMAX1(XR,.1)
        XI = ABS(FIS(J))
        XI = AMAX1(XI,.1)
        ERJ = ER(J)
        IRJ = IR(J)
        EIJ = EI(J)
        IIJ    II(J)
        KS=T(J)
        PJ = ERJ*IRJ + EIJ*IIJ
        P(J)=PJ
C                                                                   LAGGING VAR IS POSITIVE
        QJ = EIJ*IRJ - ERJ*IIJ
        Q(J)=QJ
        EJ = SQRT (ERJ**2+EIJ**2)
        IF(ENDIT)GO TO 209
        IF(SWB)GO TO 60
        WRITE(16,105)TBUS(KS),PJ,QJ,G(J),B(J),EJ
105     FORMAT(1XA4.5(3XF8.4))
60      ABSE(J) = EJ
        EJSQ = EJ**2
        EJSQI = 1.0/EJSQ
        DELPJ = FRS(J) - PJ
        IF (KS.EQ.3) GO TO 70
```

```
C                                                                           VOLTAGE INTERPOLATION
        ESTEJ = EJ + 0.63*DELPJ*(EJ-PREVE(J))/(PJ-PREVP(J))
        DESQEI = 1.0/ESTEJ**2 - EJSQI
        PREVE(J) = EJ
        PREVP(J) = PJ
C                                                                           END VOLTAGE INTERPOLATION
        IF(KS.EQ.1)GO TO 1001
        IF(KS.EQ.2)GO TO 1007
        IF(KS.EQ.4)GO TO 61
        IF(KS.EQ.5)GO TO 1005
61      WRITE(1,107)J,T(J)
107     FORMAT( 7HTYPE? 2I4)
        GO TO 25
C                                                                           POWER BUS
1001    TOLP = ABS(DELPJ/XR)
        DELQJ = FIS(J) - QJ
        TOLQ = ABS(DELQJ/XI)
        IF(TOLP.GT.TOL) GO TO 1002
        M = M + 1
        GO TO 1004
1002    G(J) = G(J) + DELPJ*EJSQI + PJ*DESQEI
1004    IF(TOLQ.GT.TOL) GO TO 1006
        M = M + 1
        GO TO 1008
1006    B(J) = B(J) + DELQJ*EJSQI+QJ*DESQEI
        GO TO 1008
C                                                                           END POWER BUS
C                                                                           SWING BUS
1005    M=M+2
        G(J)=PJ*EJSQI
        B(J)=QJ*EJSQI
        GO TO 1008
C                                                                           IMPEDANCE BUS
1007    G(J) = FRS(J)
        B(J) = FIS(J)
        M = M+2
        GO TO 1008
C                                                                           VOLTAGE BUS
C                                                                           BEGIN VARS INTERPOLATION
70      DELEJ= FIS(J)-EJ
        TOLE=ABS(DELEJ/XI)
        IF (TOLE.GT.TOL) GO TO 71
        M=M+2
        GO TO 1008
71      IF(ITERAT.EQ.1)GO TO 79

ESTQJ=QJ+0.63*DELEJ*(QJ-PREVQ(J))/(EJ-PREVE(J))
        DELQJ=ESTQJ-QJ
C                                                                           END VARS INTERPOLATION
        DESQEI = 1.0/FIS(J)**2 - EJSQI
        PREVQ(J)=QJ
        PREVE(J) = EJ
        B(J)=B(J)+DELQJ*EJSQI+QJ*DESQEI
        GO TO 1008
79      PREVQ(J)=QJ
        PREVE(J)=EJ
        B(J)=-DELEJ*EJSQI
        GO TO 1008
C                                                                           END VOLTAGE BUS
209     IJ=SQRT(IRJ**2+IIJ**2)
        THIJ=RADIAN*ATAN(IIJ/IRJ)
        THEJ=RADIAN*ATAN(EIJ/ERJ)
        WRITE(16,210)J,EJ,THEJ,IJ,THIJ,FRS(J),FIS(J)
210     FORMAT(I6,2(F8.4,F10.3),2F10.4)
        ENDIT=.TRUE.
1008    CONTINUE
C
C                                                                           ENDIT IS A FLAG TRUE WH
                                                                            EN ALL BUSSES CONVERGED
        IF(ENDIT)GO TO 1010
C                                               ALL BUSSES CONVERGED?
        IF(M.LT.NM)GO TO 132
        ENDIT=.TRUE.
        WRITE(16,130)NOFIT
130     FORMAT(15H0 CONVERGED IN I3//70H  BUS      VOLT      ANGLE      CURR
       1  ANGLE        FRS         FIS')
        GO TO 208
```

```
132     IF(SWB.GO TO 1013
        IF(ITERAT.GT.1)GO TO 1012
        WRITE(16,125)
125     FORMAT(1H 60X20HRESULT OF I.C.')
1012    GO TO 1013
        WRITE(16,120)NOFIT
120     FORMAT(1H 60X13)
1013    IF(SENSW(1))GO TO 5
C                                                   END ITERATION LOOP
75      CONTINUE.
        WRITE(16,135)NOFIT
135     FORMAT(20H0 NO CONVERGENCE IN I3//70H    BUS    VOLT    ANGLE    CU
       1RR    ANGLE       PRS         FIS')
        ENDIT=.TRUE.
        GO TO 208
1010    CONTINUE
        WRITE(16,137)TOL,DELAY
137     FORMAT(8H  TOL = F4.3,25H OF SET POINT    DELAY = I5,5H MSEC////)
```

We claim:

1. A minimum element DC circuit for representing an electric power system transmission line in accordance with preselected stability criteria and comprising a first circuit for generating an output current signal corresponding to a first coordinate component of at least the series branch equivalent current in the actual system transmission line, said first circuit having as inputs voltage phasor signals representative of first coordinate components of actual voltages at buses to which the transmission line is connected, a second circuit for generating an output current signal corresponding to a second coordinate component of at least the series branch equivalent current in the actual system transmission line, said second circuit having as inputs voltage phasor signals representative of second coordinate components of actual voltages at said buses to which said transmission line is connected, means for representing at least the series branch impedance of the actual transmission line interconnected between said first and second circuits in accordance with said preselected stability criteria allowing for minimum element simulation.

2. The DC circuit of claim 1, wherein said first circuit input signals are different to generate said first circuit output current signal, and said second circuit inputs are different to generate said second circuit output current signal.

3. The DC circuit of claim 1, wherein said first and second circuits include amplifier means for receiving as inputs corresponding voltage phasor signals and generating as outputs corresponding output current signals.

4. The DC circuit of claim 3, wherein said amplifier means are high gain operational amplifiers.

5. The DC circuit of claim 4, wherein said output current signals are generated in accordance with the differences of corresponding input voltage phasor signals.

6. The DC circuit of claim 3, wherein said output current signals are generated in accordance with the differences of corresponding input voltage phasor signals.

7. The DC circuit of claim 1, wherein said means for representing at least the series branch equivalent impedance of said transmission line includes a plurality of gain devices for representing any combination of at least the series branch, resistance and reactance of the transmission line.

8. The DC circuit of claim 7, wherein said gain devices are set to represent preselected gains in accordance with the application of Nyquist stability criteria for all possible polarities of said coordinate components of bus voltages to assure stable circuit operation.

9. The DC circuit of claim 8, wherein only one additional amplifier means is connected to one of said gain devices dependent on the setting of said preselected gains, thereby providing for minimum element operation.

10. The DC circuit of claim 7, wherein said plurality of gain devices are potentiometers.

11. A minimum element DC circuit for representing an electric power system bus in accordance with preselected stability criteria and comprising a first circuit for generating an output voltage signal corresponding to a first coordinate component of the bus voltage at the actual system bus, said first circuit having as an input a current phasor signal representative of a first coordinate component of the net current flowing into said actual bus from system transmission lines to which the bus connects, a second circuit for generating an output voltage signal corresponding to a second coordinate component of the voltage at the actual system bus, said second circuit having as an input a current phasor signal representative of a second coordinate component of the net current flowing into said actual bus from system transmission lines, and means for representing the bus to ground admittance of the actual bus interconnected between said first and second circuits in accordance with said preselected stability criteria, allowing for minimum element simulation.

12. The DC circuit of claim 11, wherein said first and second circuits include amplifier means for receiving as inputs corresponding current phasor signals and generating as outputs corresponding output voltage signals.

13. The DC circuit of claim 12, wherein said amplifier means are high gain operational amplifiers.

14. The DC circuit of claim 12, wherein said first and second circuits include means for establishing proportional plus integral control connected across each of said amplifier means to provide low proportional gain for a high damped response and to bring any steady state error towards zero.

15. The DC circuit of claim 11, wherein said means for representing the bus to ground admittance of the actual bus includes a plurality of gain devices for representing any combination of the bus to ground conductance and susceptance of the bus.

16. The DC circuit of claim 15, wherein said gain devices are set to represent preselected gains in accordance with the application of a Nyquist stability criteria for all possible polarities of said first and second coordinate components of net current, to assure stable circuit operation.

17. The DC circuit of claim 15, wherein said plurality of gain devices are digital to analog multipliers, the values of which are set digitally.

18. The DC circuit of claim 15, wherein the selection of combinations of bus to ground conductances and susceptances are chosen in dependence upon the type of bus to be represented.

19. The DC circuit of claim 18, wherein said means for establishing proportional plus integral control includes a serial combination of resistance and capacitance adjustable for desired performance.

20. A hybrid load flow computer arrangement for generating electric power system load flow solutions, and comprising a digital computer, connected to an analog network simulator, said analog network simulator including a plurality of DC circuit modules for representing system transmission lines and buses, said transmission line modules connected to preselected bus modules through nodal equation circuitry, each of said transmission line modules including first and second circuits for receiving corresponding signals representing differences between first coordinate components and second coordinate components of actual voltages at buses to which the transmission line is connected, and generating first and second coordinate component current signals representing actual components of transmission line current and means for representing at least the series branch impedance of the actual transmission line interconnected between said first and second circuits in accordance with preselected stability criteria allowing for minimum element simulation, each of said bus modules including first and second circuits for receiving first and second coordinate components of net current into the actual bus and generating first and second coordinate component voltage signals representing components of actual bus voltage and means for representing the bus to ground admittance of the actual bus interconnected between said first and second circuits of said bus modules in accordance with preselected stability criteria, said nodal equation circuitry receiving coordinate component current signals from said transmission line modules and generating net current signals as inputs to said bus modules, said digital computer providing preselected parameter values to said simulator, storing bus voltage values and net current values from said simulator, and operating to guide the analog simulator to a load flow solution through digital to analog adjustment of said bus module admittance representing means in accordance with preselected load flow solution relationship between bus voltages and line currents.

21. The hybrid load flow computer arrangement of claim 20, wherein each of said first and second circuits of said transmission line modules include amplifier means for receiving said corresponding signals representing differences between first coordinate components and second coordinate components of actual bus voltages and generating corresponding output current signals.

22. The hybrid computer arrangement of claim 21, wherein said amplifier means are high gain operational amplifiers.

23. The hybrid computer arrangement of claim 21, wherein said means for representing at least the series branch of equivalent impedance of each of said transmission lines includes a plurality of gain devices for representing any combination of at least the series branch resistance and reactance of the transmission line.

24. The hybrid computer arrangement of claim 23, wherein said transmission line gain devices are set to represent preselected gains in accordance with the application of Nyquist stability criteria for all possible polarities of said coordinate components of bus voltages to assure stable circuit operation.

25. The hybrid computer arrangement of claim 24, wherein only one additional amplifier means is connected to one of said gain devices, dependent on the setting of said preselected gains, thereby providing for minimum element operation.

26. The hybrid computer arrangement of claim 23, wherein said plurality of gain devices are potentiometers.

27. The hybrid computer arrangement of claim 20, wherein each of said first and second circuits of said bus modules include amplifier means for receiving corresponding coordinate component signals of net bus current and generating corresponding output voltage component signals.

28. The hybrid computer arrangement of claim 27, wherein said amplifier means are high gain operational amplifiers.

29. The hybrid computer arrangement of claim 27, wherein said means for representing the bus to ground admittance of each bus includes a plurality of gain devices for representing any combination of bus to ground conductance and susceptance.

30. The hybrid computer arrangements of claim 29, wherein said bus gain devices are set to represent preselected gains in accordance with the application of Nyquist stability criteria for all possible polarities of said coordinate components of net bus current, to assure stable circuit operation.

31. The hybrid computer arrangement of claim 29, wherein said plurality of bus gain devices are digital to analog multipliers, the values of which are set by said digital computer through digital to analog channel devices connected from said digital computer to said analog simulator bus modules.

32. The hybrid computer arrangement of claim 27, wherein each of said first and second circuits of said bus modules include means for establishing proportional plus integral control connected across each of said amplifier means to provide low proportional gain for a high damped response and to bring any steady state error towards zero.

33. The hybrid computer arrangement of claim 32, wherein said means for establishing proportional plus integral control includes a serial combination of resistance and capacitance adjustable for desired performance.

34. The hybrid computer arrangement of claim 20, wherein said digital computer receives values of net bus currents and bus voltage components through analog to digital multiplexing means connected from bus module circuitry and nodal equation circuitry to said digital computer.

35. The hybrid computer arrangement of claim 20, wherein said nodal equation circuitry includes a plurality of capacitor means for receiving first transmission line component current signals and generating first coordinate components of net bus current for transmission lines connected to a corresponding bus, and for receiving second transmission line component current signals and generating second coordinate components of net bus current for transmission lines connected to said corresponding bus.

36. The hybrid computer arrangement of claim 20, wherein one of said bus modules is chosen as a slack or reference bus.

37. A method for making hybrid load flow solutions for an electric power system using a digital computer and an analog network simulator that includes a plurality of DC circuit modules to represent transmission lines and buses of said electric power system, said circuit modules being connected through nodal equation circuitry, said method comprising, a. Applying signals from said digital computer through a digital to analog multiplexer to cause digital to analog multiplier devices to represent bus to ground conductances and susceptances in said bus modules in accordance with conductance and susceptance values generated in the digital computer, b. Applying input voltage phasor signals representative of system bus voltages to said transmission line modules, c. Generating net bus current signals from said transmission line modules through said nodal equation circuitry, d. Applying said net bus current signals to said bus modules, e. Generating bus voltage signals from said bus modules, f. Applying said bus voltage signals and current signals to said digital computer through analog to digital channel devices, g. Determining in said digital computer initial values of bus conductances and susceptances for all system buses in accordance with predetermined restraints on bus voltage values, and bus real and reactive power values, h. Determining in said digital computer bus real and reactive powers and bus voltage magnitudes in accordance with bus voltage and current values delivered to said digital computer, and i. Iterating the values of bus to ground conductances and susceptances in said digital computer in accordance with preselected increments of conductances, susceptances, real and reactive powers and voltage magnitudes dependent upon whether a given bus is a load bus or a voltage regulated bus, until said predetermined restraints are satisfied in accordance with said preselected increments of real and reactive powers and bus voltage magnitude.

\* \* \* \* \*